(12) United States Patent
Jen

(10) Patent No.: US 8,619,649 B2
(45) Date of Patent: Dec. 31, 2013

(54) METHOD OF HANDLING RANDOM ACCESS PROCEDURE AND RELATED COMMUNICATION DEVICE

(75) Inventor: Yu-Chih Jen, Taoyuan County (TW)

(73) Assignee: HTC Corporation, Taoyuan, Taoyuan County (TW)

( * ) Notice: Subject to any disclaimer, the term of this patent is extended or adjusted under 35 U.S.C. 154(b) by 588 days.

(21) Appl. No.: 12/835,761

(22) Filed: Jul. 14, 2010

(65) Prior Publication Data

US 2011/0014922 A1  Jan. 20, 2011

Related U.S. Application Data

(60) Provisional application No. 61/225,216, filed on Jul. 14, 2009, provisional application No. 61/226,289, filed on Jul. 17, 2009.

(51) Int. Cl.
*H04B 7/00* (2006.01)
*H04W 4/00* (2009.01)

(52) U.S. Cl.
USPC ........ 370/310.2; 370/329; 370/332; 370/414; 370/438

(58) Field of Classification Search
USPC ...................... 370/329, 310.2, 332, 414, 438
See application file for complete search history.

(56) References Cited

U.S. PATENT DOCUMENTS

| | | | |
|---|---|---|---|
| 2001/0024956 A1* | 9/2001 | You et al. | 455/455 |
| 2006/0246902 A1* | 11/2006 | Back et al. | 455/436 |
| 2008/0084892 A1* | 4/2008 | Sheen et al. | 370/410 |
| 2008/0259900 A1 | 10/2008 | Masuda | |
| 2009/0238141 A1* | 9/2009 | Damnjanovic et al. | 370/331 |
| 2010/0002590 A1* | 1/2010 | Park et al. | 370/241 |
| 2010/0202288 A1* | 8/2010 | Park et al. | 370/230 |
| 2011/0014922 A1* | 1/2011 | Jen | 455/450 |
| 2011/0243075 A1* | 10/2011 | Luo et al. | 370/329 |

FOREIGN PATENT DOCUMENTS

| | | |
|---|---|---|
| CN | 101252774 A | 8/2008 |
| CN | 101345580 A | 1/2009 |
| CN | 101478824 A | 7/2009 |

OTHER PUBLICATIONS

Office action mailed on Aug. 27, 2012 for the China application No. 201010233974.6, filing date Jul. 14, 2010, p. 1-8.
3GPP TR 36.814 V0.3.2 3rd Generation Partnership Project; Technical Specification Group Radio Access Network; Further Advancements for E-UTRA Physical Layer Aspects (Release X), Jan. 2009.
3GPP TS 36.321 V8.6.0 3rd Generation Partnership Project; Technical Specification Group Radio Access Network; Evolved Universal Terrestrial Radio Access (E-UTRA) Medium Access Control (MAC) protocol specification (Release 8), Jun. 2009.
3GPP TS 36.213 V8.7.0 3rd Generation Partnership Project; Technical Specification Group Radio Access Network; Evolved Universal Terrestrial Radio Access (E-UTRA); Physical layer procedures (Release 8), May 2009.

* cited by examiner

*Primary Examiner* — Benjamin H Elliott, IV
(74) *Attorney, Agent, or Firm* — Winston Hsu; Scott Margo

(57) ABSTRACT

A method of handling random access procedure for a network in a wireless communications system is disclosed. The method comprises configuring a plurality of access points or a plurality of component carriers with at least one of a plurality of physical random access channel (PRACH) resources, a plurality of preamble formats, and a plurality of preamble sequences, whereby a mobile device of the wireless communication system uses at least one of the plurality of PRACH resources, the plurality of preamble formats, and the plurality of preamble sequences to access at least one of the plurality of access points or the plurality of component carriers when performing at least a random access procedure.

11 Claims, 17 Drawing Sheets

METHOD OF HANDLING RANDOM ACCESS PROCEDURE AND RELATED COMMUNICATION DEVICE

CROSS REFERENCE TO RELATED APPLICATIONS

This application claims the benefit of U.S. Provisional Application No. 61/226,289, filed on Jul. 17, 2009 and entitled "Method and Apparatus to enhance Random Access Procedure for multiple access points and carriers", and U.S. Provisional Application No. 61/225,216, filed on Jul. 14, 2009 and entitled "Method and Apparatus for enhancing Random Access Procedure with relay deployment" the contents of which are incorporated herein in their entirety.

BACKGROUND OF THE INVENTION

1. Field of the Invention

The present invention relates to a method used in a wireless communications system and related communication device, and more particularly, to a method of handling random access procedure with multiple access points and component carriers or with the relay deployment in a wireless communications system and related communication device.

2. Description of the Prior Art

A long-term evolution (LTE) system, initiated by the third generation partnership project (3GPP), is now being regarded as a new radio interface and radio network architecture that provides a high data rate, low latency, packet optimization, and improved system capacity and coverage. In the LTE system, an evolved universal terrestrial radio access network (E-UTRAN) includes a plurality of evolved Node-Bs (eNBs) and communicates with a plurality of mobile stations, also referred as user equipments (UEs). The UE of the LTE system can transmit and receive data on only one carrier component at any time.

Toward advanced high-speed wireless communication system, such as transmitting data in a higher peak data rate, LTE-Advanced is standardized by the 3rd Generation Partnership Project (3GPP) as an enhancement of LTE system. LTE-Advanced targets faster switching between power states, improves performance at the cell edge, and includes subjects, such as bandwidth extension, coordinated multi-point transmission/reception (COMP), multiple input multiple output (MIMO), relay deployment, etc.

For bandwidth extension, carrier aggregation is introduced to the LTE-Advanced for extension to wider bandwidth, where two or more component carriers are aggregated, for supporting wider transmission bandwidths e.g. up to 100 MHz and for spectrum aggregation. According to carrier aggregation capability, multiple component carriers are aggregated into overall wider bandwidth, wherein UE can establish multiple links corresponding to the multiple component carriers for simultaneously receiving and/or transmitting on each component carrier.

The COMP is considered for LTE-Advanced as a tool to improve coverage of high data rates, cell edge throughput, and system efficiency, which implies dynamic coordination among multiple geographical separated points. That is, when an UE is in a cell-edge region, the UE is able to receive signal from multiple cells, and the multiple cells can receive transmission of the UE.

In addition, a relay node in the LTE-Advanced system is considered to improve the coverage of high data rates, group mobility, temporary network deployment, the cell-edge throughput and to extend coverage. The relay can be deployed at the cell edge where the eNB may not be unable to provide required radio quality/throughput for the UEs that shall be served by the eNB or at certain location where radio signals of the eNB may not cover.

Moreover, with the relay deployment in the LTE-Advanced system, continuous uplink/downlink transmission/reception opportunities are not feasible due to interference consideration of in band relaying operation (namely eNB-to-relay link operates in the same frequency spectrum as the relay-to-UE link). In order to handle the interference problem, a "gap" concept is introduced so that the eNB or UE during the gap may not expect any relay transmission. For example, the relay-to-UE transmission is performed only during normal subframes, whereas the eNB-to-relay transmission is performed only during multi-media broadcast over a single frequency network (MBSFN) subframes.

However, with consideration of the relay deployment, the COMP, and carrier aggregation in the LTE-Advanced system, several scenarios are described as follows.

In the first scenario, under relay deployment, a UE may be able to hear both the base station(s) and the relay(s), or only hear either base station(s) or the relay(s). In contrary, the network (e.g. base station or relay) has a difficulty in justifying whether the UE can receive signals from the base station or the relay, especially when UE in IDLE mode. Sometimes, only UE knows signal strength by measurement for the base station and the relay. Or, the network determines whether the UE receives signals from the base station or the relay only according to the measurement report from the UE. Consequently, it makes control function, scheduling and coordination more important factors. Judging from the scenarios, for a random access procedure in a communications system with relay deployment, the network currently has no way to justify whether the UE shall access the relay rather than base station or not (and vice versa), thereby the system performance may be downgraded without the well implemented control function, scheduling and coordination of the network.

In the second scenario, the LTE-Advanced system does not define how to applied configurations such as power control parameters for physical random access channel (PRACH) access, random access radio network temporary identifiers (RA-RNTIs), physical down link control channels (PDCCHs), temporary cell radio network temporary identifiers (T-CRNTIs), back-off timers, random access response (RAR) window and contention resolution timers, for the multiple access points or component carriers.

In the third scenario, during a random access procedure, a RAR message of the random access procedure includes response to preambles where each preamble is assigned with different T-CRNTI or UL grant. Meanwhile, contention among preambles used by the UEs could happen due to the same preamble shared among UEs. The network makes use of different T-CRNTIs or resources (for PRACH transmission or UL transmission) for different access points or component carriers, or for distinguishing which access points or component carriers UE accesses to or would like to access. However, a number of T-CRNTIs or resources (e.g. time/frequency, preamble, root sequence) may not enough to differentiate the association of the access points or component carriers. Thus, the UE may not know how to recognize the RAR message including duplicated T-CRNTIs, or resources. That is, the LTE-Advanced system does not specify how the UE shall deal with the situation of insufficient resources.

In the fourth scenario, after UE transmits random access preamble for a random access procedure, the UE shall wait for the RAR message with RA-RNTI potentially addressed to the RAR message according to the accessed PRACH resource until RAR window (e.g. [RA_WINDOW_BEGIN—RA_W-INDOW_END]) expires. However, when the UE is under control by a relay, it is possible that due to in band relaying operation, the relay (or even base station) does not transmit RAR to the UE before window expiry (e.g. UE does not expect any downlink transmission during base station to relay transmission) if not well scheduled (e.g. base station may not realize when the relay would like to response to the UE at DL or when the relay request the UE for UL transmission) or due to some purposes (important transmissions from base station to relay node). In addition, the relay may postpone transmitting a contention resolution message due to in band relaying operation. How the UE deal with these situations is never concerned. Here the link between relay and UE is the access link while a link between base station and relay is the backhaul link. While relay and UE involve in the random access procedure performed by the UE, the random access procedure can also be performed by the relay on the backhaul link between base station and relay. In other words, the relay, as also a mobile device, can reuse UE's random access procedure and play a role similar to the UE while performing random access procedure with the base station (e.g. base station to the relay is similar to the relay to the UE or base station to the UE).

Therefore, the fourth scenario between relay and UE can be reconsidered as the scenario between base station and relay. After relay transmits random access preamble for a random access procedure, the relay shall wait for the RAR message with RA-RNTI potentially addressed to the RAR message according to the accessed PRACH resource until RAR window (e.g. [RA_WINDOW_BEGIN—RA_WINDOW_END]) expires. However, when the relay is under control or coverage of a base station, it is possible that due to in band relaying operation, the base station does not transmit RAR to the relay before window expiry (e.g. relay does not expect any downlink transmission from the base station during relay to UE transmission) or the base station transmits RAR in a subframe but the relay doesn't expect any DL transmission in the subframe, if not well scheduled (e.g. base station may realize the UL/DL transmission scheduled by the relay or base station itself) or due to some purposes (e.g. important transmissions from relay to UE). In addition, the base station may postpone transmitting a contention resolution message due to in band relaying operation. How the relay deal with these situations is never concerned.

In the fifth scenario, if the UE receives the RAR from the network, the UE makes use of an uplink (UL) grant 6 ms later after reception for UL transmission of message 3 for a contention based RA procedure. However, due to in band relaying operation, the UE should not transmit message 3 at UL to relay if the relay is transmitting to the base station at the same subframe, or the relay just ignores the UL transmission of the random access procedure from the UE. LTE-Advance system does not define how the relay informs the in-band UL transmission to the UE so that the UL grant should not be applied or should be postponed with a new grant.

Similarly, the fifth scenario between relay and UE can be reconsidered as the scenario between base station and relay. If the relay receives the RAR from the network (e.g. base station), the relay makes use of an uplink (UL) grant 6 ms later after reception for UL transmission of message 3 for a contention based RA procedure. However, due to in band relaying operation, the relay should not transmit message 3 at UL to the base station if the UE is scheduled transmit to the relay at the same subframe, or the base station just ignores the UL transmission of the random access procedure from the relay. LTE-Advance system does not define how the base station informs the in-band UL transmission to the relay or how the relay realizes there will be a scheduled UL transmission to base station before the relay schedules the UE for a UL transmission at the same subframe, so that the UL grant should not be applied or should be postponed with a new grant or as a new grant.

SUMMARY OF THE INVENTION

A method of handling positioning measurement in a wireless communications system is disclosed to solve the above-mentioned problems.

A method of handling random access procedure for a network in a wireless communications system is disclosed. The method comprises configuring a plurality of access points or a plurality of component carriers with at least one of a plurality of physical random access channel (PRACH) resources, a plurality of preamble formats, and a plurality of preamble sequences, whereby a mobile device of the wireless communication system uses at least one of the plurality of PRACH resources, the plurality of preamble formats, and the plurality of preamble sequences to access at least one of the plurality of access points or the plurality of component carriers when performing at least a random access procedure.

A method of handling random access procedure for a mobile device in a wireless communications system is disclosed. The method comprises performing a random access procedure to access a network of the wireless communication system, and determining at least one of a physical random access channel (PRACH) resource, a preamble format and a preamble sequence for the random access procedure according to the nearest PRACH opportunity, according to a selection rule, or according to a measurement or an indication from network.

A method of handling random access procedure for a network in a wireless communications system is disclosed. The method comprises configuring a plurality of access points or a plurality of component carriers with different sets of power control parameters for physical random access channel (PRACH) access, different PRACH resources and associated random access radio network temporary identifiers (RA-RNTIs), different physical down link control channels (PDCCHs), different sets of temporary cell radio network temporary identifiers (T-CRNTIs), different back-off control parameters, different random access response (RAR) window length, and different contention resolution timer length, whereby a mobile device decides at least one of at least an access point and at least a component carrier to perform at least one random access procedure, and uses the at least one configuration associated with the at least one of at least an access point and at least a component carrier during the at least one random access procedure.

A method of handling random access procedure for a mobile device in a wireless communications system is disclosed. The method comprises performing at least a random access procedure to access at least an access point or component carrier, and deciding which component carriers or access points to camp on according to service requirements or service priorities of the mobile device.

A method of handling random access procedure for a network in a wireless communications system is disclosed. The method comprises configuring different service requirements or a service priorities to different component carriers or access points.

A method of handling random access procedure for a mobile device in a wireless communications system is disclosed. The method comprises performing at least a random access procedure to access at least an access point or component carrier with at least a preamble, receiving from the at least an access points or the component carrier at least a random access response (RAR) message addressed by at least a random access radio network temporary identifiers (RA-RNTIs) associated with at least a physical random access channel (PRACH) access or configuration, where the RAR messages include at least one of duplicated temporary cell radio network temporary identifiers (T-CRNTIs) and uplink grants for the preambles, or each of RAR messages includes at least one of duplicated T-CRNTIs and UL grants for the preambles, or the RAR messages include the preambles associated with at least one of duplicated T-CRNTIs and UL grants.

A method of handling random access procedure for a network in a wireless communications system is disclosed. The method comprises configuring a plurality of access points or component carriers with the same physical random access channel (PRACH) configuration, whereby a mobile device of the wireless communication system performs at least a random access procedure to access PRACH with at least a preamble.

A method of handling random access procedure for a mobile device in a wireless communications system is disclosed. The method comprises performing at least a random access procedure to access at least an access point or component carrier, and determining which access point or component carrier transmits a random access response (RAR) message according to a RA-RNTI detected in the RAR message, a T-CRNTI allocated in the RAR message, or an uplink grant in the RAR message.

A method of handling random access procedure for a mobile device in a wireless communications system is disclosed. The method comprises performing a random access procedure to a network of the wireless communication system, waiting for a contention resolution message of the random access procedure until expiry of a contention resolution related timer or stop of the contention resolution related timer, or as long as the mobile device does not detect that the mobile devices wins a contention associated with the random access procedure before the expiry of the contention resolution related timer or a re-contention wait timer.

A method of handling random access procedure for a network in a wireless communications system is disclosed. The method comprises receiving a first uplink transmission of a first random access procedure from a first mobile device of the wireless communication system and a second uplink transmission of a second random access procedure from a second mobile device of the wireless communication system, and responding to the first mobile device with a first contention resolution message and then responding to the second mobile device with a second contention resolution message before a contention resolution timer at the first mobile device or at the second mobile device expires, where the first and the second mobile device share the same time-frequency resource for the first and second uplink transmissions, or the first and the second UE use different time-frequency resources for the first and second uplink transmissions, or responding to the first mobile device with a first contention resolution message and then responding to the second mobile device with a second contention resolution message before a re-contention wait timer at the first mobile device or at the second mobile device expires, where the first and the second mobile device share the same time-frequency resource for the first and second uplink transmissions, or the first and the second UE use different time-frequency resources for the first and second uplink transmissions, or responding to the first mobile device and the second mobile device in the same contention resolution message.

A method of handling random access procedure for a mobile device in a wireless communications system is disclosed. The method comprises initiating a random access (RA) procedure, and prioritizing a transmission or reception related to the RA procedure at at least a subframe when each of the at least a subframe is configured for a first purpose other than a RA purpose or when the mobile device is allocated with a uplink grant at the at least a subframe.

A method of handling random access procedure for a network in a wireless communications system is disclosed. The method comprises transmitting to a mobile device a first downlink transmission related to a random access (RA) procedure of the mobile device or expecting a first uplink transmission from the mobile device related to the RA procedure during at least a first subframe, when the mobile device has been configured with the at least a first subframe for a first purpose other than a RA purpose or has been allocated with an uplink grant for the at least a first subframe.

A method of handling random access procedure for a network in a wireless communications system is disclosed. The method comprises not transmitting a downlink transmission, a random access response (RAR) or a contention resolution message of a random access (RA) procedure to a mobile device during at least a first subframe when a transmission opportunity collision associated with the at least a first subframe occurs, or not scheduling uplink transmission or uplink transmission of the RA procedure to the mobile device during at least a second subframe.

A method of handling random access procedure for a mobile device in a wireless communications system is disclosed. The method comprises receiving at least one of system information and control signaling, wherein the system information or control signaling includes at least one of information about an in-band uplink transmission opportunity corresponding to a relay and information used for prohibiting the in-band uplink transmission opportunity corresponding to the mobile device dynamically or semi-statically.

A method of handling random access procedure for a mobile device in a wireless communications system is disclosed. The method comprise initiating a random access procedure to a network entity, waiting for a contention resolution message during the random access procedure until expiry or stopping of a timer, and waiting for the contention resolution message during the random access procedure when the mobile device does not detect that the mobile device is a winner of a contention of the random access procedure before the expiry of the timer or expiry of a re-contention wait timer, wherein the timer provides validity of period of receiving the contention resolution message.

A method of handling random access procedure for a network entity in a wireless communications system is disclosed. The method comprises determining whether a first mobile device can win the next available contention or not, wherein the first mobile device loses a contention of a random access procedure, and determining whether a second mobile device can win the next available contention (possible at next transmission of contention resolution message) or not, wherein the second mobile device wins the contention and has failed in reception of a message 4 of the random access procedure.

A method of handling random access procedure for a network entity in a wireless communications system is disclosed. The method comprises responding a contention resolution message including contention corresponding to a plurality areas of coverage.

A method of handling random access procedure for a mobile device in a wireless communications system is disclosed. The method comprises initiating a random access procedure, and waiting for a time or a first number of re-contention chance when the mobile device detects that the mobile device is a loser in a contention of the random access procedure.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
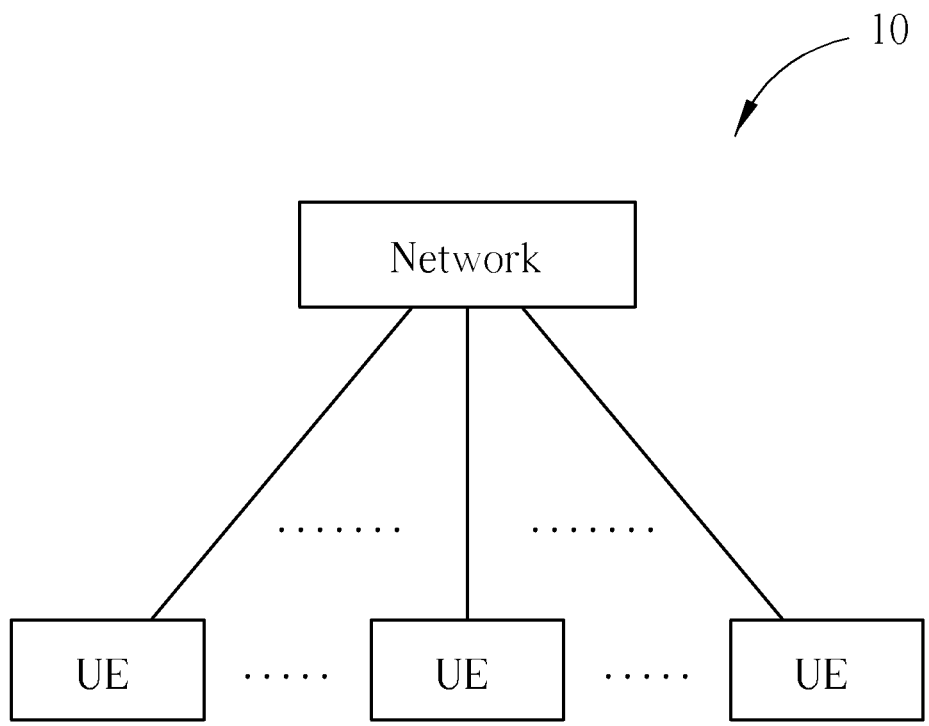
FIG. 1 is a schematic diagram of an exemplary wireless communications system.

Please refer to FIG. 1, which is a schematic diagram of a wireless communication system 10 according to an example of the present disclosure. The wireless communication system 10, such as an LTE-A (long-term evolution-advanced) system or other mobile communication systems supporting carrier aggregation, and coordinated multipoint transmission/reception (COMP), is briefly composed of a network and a plurality of user equipments (UEs). In FIG. 1, the network and the UEs are simply utilized for illustrating the structure of the wireless communication system 10. Practically, the network can be referred as to an E-UTRAN (evolved-UTAN) comprising a plurality of evolved Node-Bs (eNBs) and relays in the LTE-A system. The relays are deployed to improve the coverage of high data rates, group mobility, temporary network deployment, the cell-edge throughput and provide coverage in new areas. The relay is wirelessly connected to the network via a donor cell. The UEs can be devices such as mobile phones, computer systems, or even relays related to base station, etc. Besides, the network and the UE can be seen as a transmitter or receiver according to transmission direction, e.g., for uplink (UL), the UE is the transmitter and the network is the receiver, and for downlink (DL), the network is the transmitter and the UE is the receiver.

Figure 2:
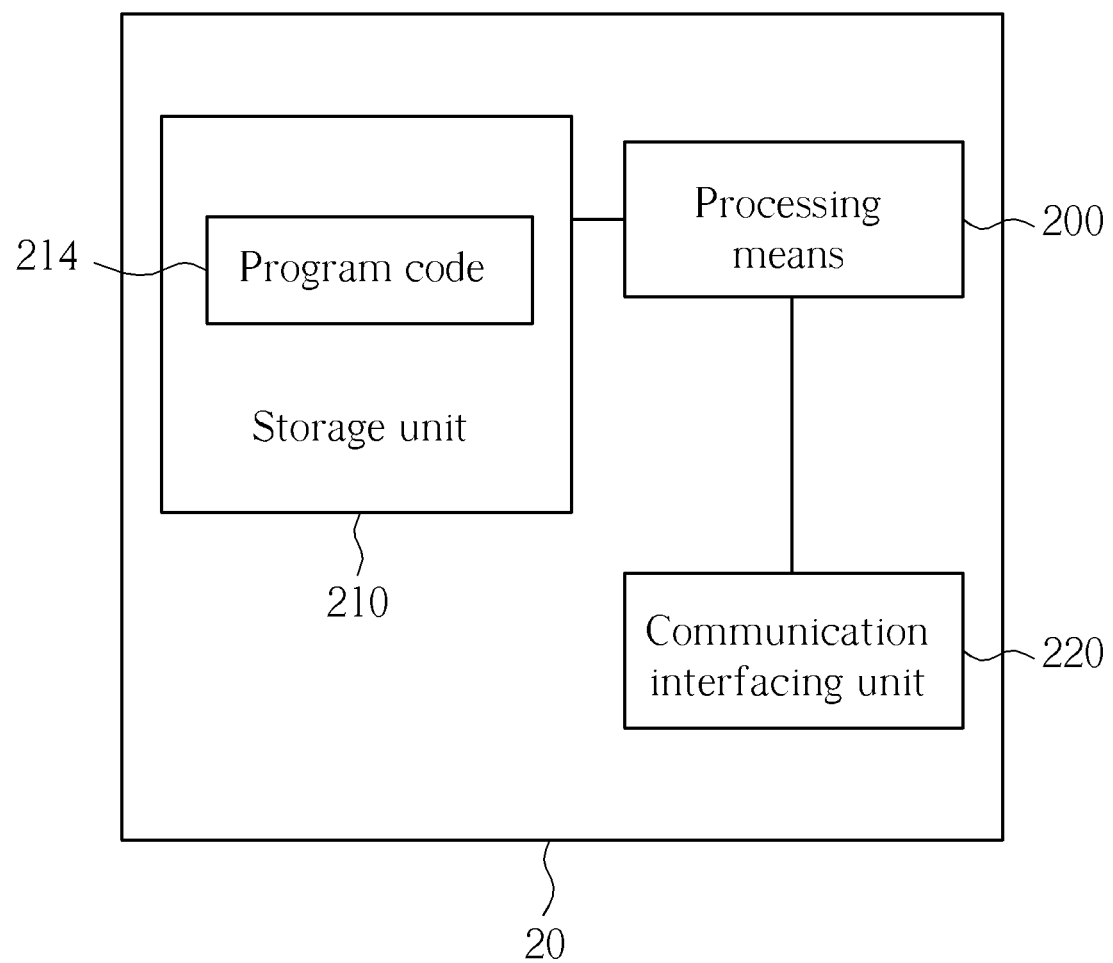
FIG. 2 illustrates a schematic diagram of an exemplary communication device.

FIG. 2 illustrates a schematic diagram of an exemplary communication device 20. The communication device 20 can be the mobile device or the network shown in FIG. 1. The communication device 20 may include a processing means 200 such as a microprocessor or Application Specific Integrated Circuit (ASIC), a storage unit 210 and a communication interfacing unit 220. The storage unit 210 may be any data storage device that can store program code 214, for access by the processing means 200. Examples of the storage unit 210 include but are not limited to a subscriber identity module (SIM), read-only memory (ROM), random-access memory (RAM), CD-ROMs, magnetic tapes, hard disks, and optical data storage devices. The communication interfacing unit 220 is preferably a radio transceiver and can exchange wireless signals with the network according to processing results of the processing means 200.

Figure 3:
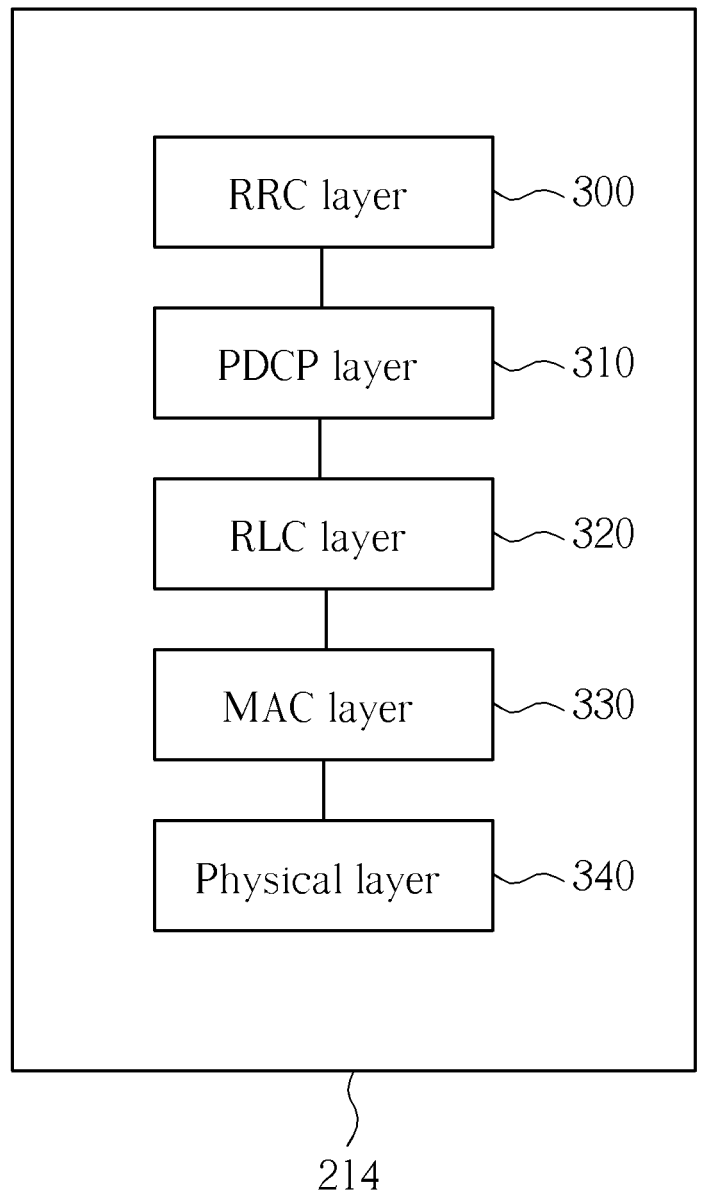
FIG. 3 illustrates a schematic diagram of exemplary program code.

Please refer to FIG. 3, which illustrates a schematic diagram of the program code 214 for the LTE system according to an example. The program code 214 includes program code of multiple communications protocol layers, which from top to bottom are a radio resource control (RRC) layer 300, a packet data convergence protocol (PDCP) layer 310, a radio link control (RLC) layer 320, a medium access control (MAC) layer 330 and a physical (PHY) layer 340. The MAC layer 330 supports a random access procedure used for accessing the network (e.g. the base station and the relay). In this article, the base stations and the relays are referred as access points.

Figure 4:
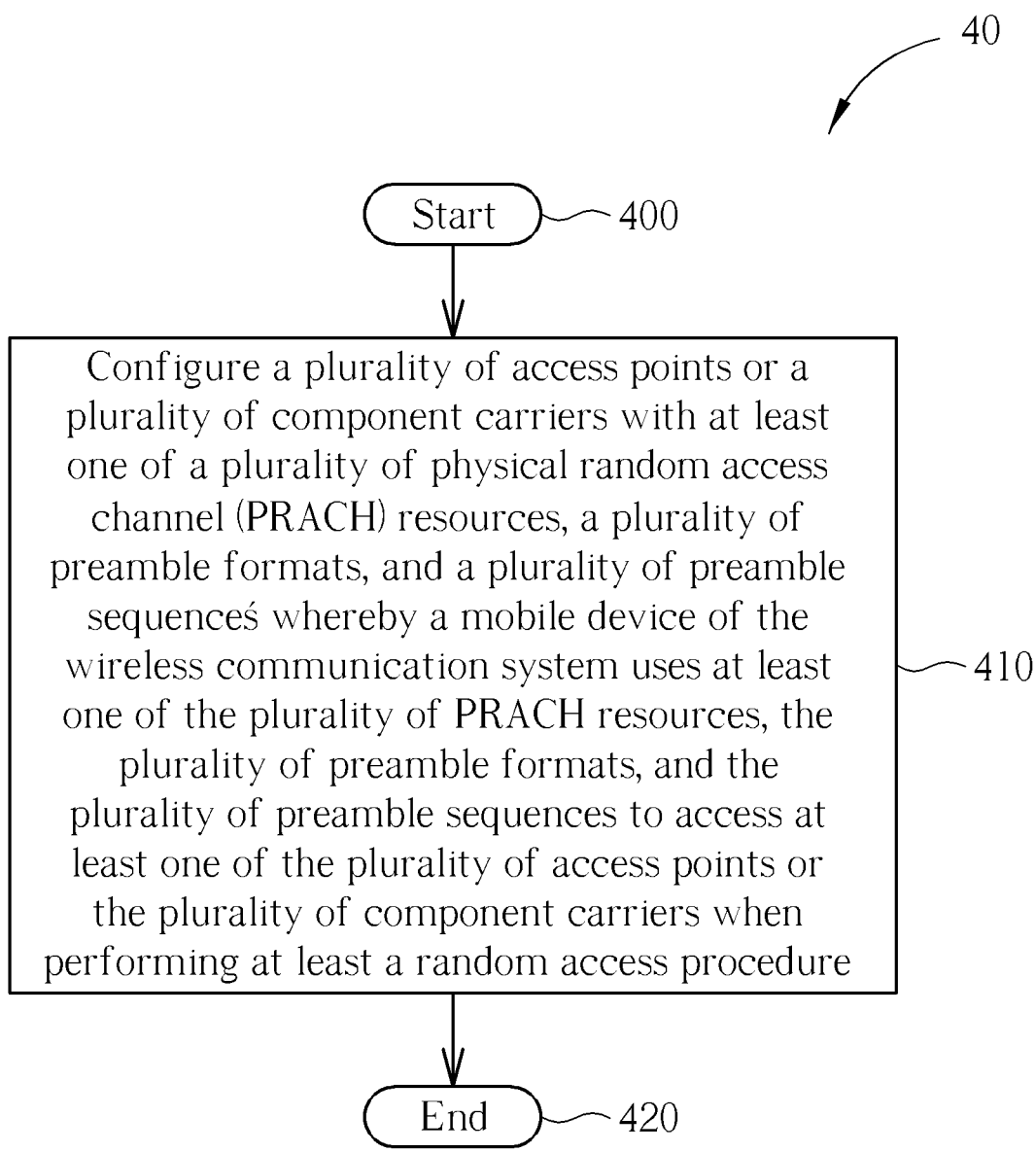
FIG. 4-21 are flowcharts of exemplary processes according to the present disclosure.

Please refer to FIG. 4, which illustrates a flowchart of an exemplary process 40. The process 40 is utilized in a network of a wireless communications system for handling a random access procedure. The process 40 may be compiled into the program code 214 and includes the following steps:

Step 400: Start.

Step 410: Configure a plurality of access points or a plurality of component carriers with at least one of a plurality of physical random access channel (PRACH) resources, a plurality of preamble formats, and a plurality of preamble sequences; whereby a mobile device of the wireless communication system uses at least one of the plurality of PRACH resources, the plurality of preamble formats, and the plurality of preamble sequences to access at least one of the plurality of access points or the plurality of component carriers when performing at least a random access procedure.

Step 420: End.

According to the process 40, the plurality of access points or component carriers is configured with different or partially different PRACH resources (e.g. time or frequency), preamble formats (e.g. root sequence), or preamble sequences. Therefore, the UE makes use of at least one the PRACH resource(s), preamble format(s), and preamble sequence(s) respectively to accessing at least one of plurality of access points or component carriers when the UE performs at least a random access procedure. In other words, the UE can decide to used which PRACH configuration (e.g. different resources, formats, or root sequences) for access when the plurality of access points/component carriers use different PRACH configurations. The number of the plurality of access points is two or more than two, and can be operated at the same component carrier or different component carriers. In addition, the plurality of access points may consist of a donor base station and at least one relay, or may consist of at least one base station and at least one relay node (e.g. for CoMP operation).

The PRACH resources, preamble formats, and preamble sequences can be configured by at least one network entity (e.g. a base station and a relay), and is broadcasted in system information or control signaling (e.g. CoMP configuration) from the network (e.g. a donor base station or the relay). The donor base station includes configuration of the plurality of access points or component carriers in system information or control signaling, whereas the relay node includes its own related configuration in system information (e.g. system information from the relay) or control signaling. Moreover, the relay is non-transparent to UE with a relay indication or relay identity, and has no separated cell identity for its coverage.

After the UE accesses on at least a PRACH resource with at least a preamble transmission, at least one of the access points receiving the preamble transmissions determines which access point(s) or component carrier(s) the UE accesses. For example, one of the access points receiving the preamble knows that the UE accesses to according to the reception of the preamble from the UE. Moreover, one of the access points knows which access point(s) or component carrier(s) the UE accesses (or would like to access) according to at least one of the accessed PRACH resource(s) (e.g. time and/or frequency), used preamble format(s) (e.g. root sequence), and used preamble sequence(s). Then, the accessed access points receiving the preambles respond to the UE with random access response (RAR) messages addressed by random access radio network temporary identifiers (RA-RNTIs) associated with the accessed PRACH resources. Thus, the UE monitors the PDCCHs for the RAR messages identified by the RA-RNTIs, and the UE knows which access points/component carriers receive preambles according to the responded RAR messages.

Alternatively, only part of the accessed access points respond to the UE with RAR messages addressed by RA-RNTIs associated with the accessed PRACH resources. In addition, the accessed access points or part of the accessed access points respond to the UE with the RAR messages addressed by the RA-RNTIs according to at least one of measurement, reception, preamble detection, power control, interference control, or the traffic load (e.g. load balancing). The part of access points can be at least one access point (e.g. just 1). Please note that, the UE may receive only one RAR message from the only one access point, or only one access point (e.g. after coordination among access points) responds to the UE with a RAR message.

Take an example based on the process 40, after the UE accesses on the PRACH resources with preamble transmissions, all or each of the access points receiving the preamble transmission, or at least one access point responds to the UE the RAR message(s) addressed by the RA-RNTI(s) associated with the accessed PRACH resource(s). The RAR message from each of access points is addressed by a RA-RNTI associated with each of access points respectively (e.g. UE receives two RAR messages from two access points receiving preamble transmission, where the two RAR messages are addressed by two RA-RNTIs), or the RAR message from each of access points is addressed by the same RA-RNTI. In addition, the RAR message from each of access points is received on different physical down link control channels (PDCCHs) associated with each of the access points respectively, or on the same PDCCH.

Moreover, all or each of the RAR messages responded to the UE include different T-CRNTIs or UL grants for different access points or component carriers, or are received by/transmitted to the UE in different subframes for different access points or component carriers. Or, only one RAR message responded to the UE includes a T-CRNTI or an UL grant for a specific access point or component carrier, or is received by/transmitted to the UE in a specific subframe for the specific access point or component carrier. In addition, only one RAR message responded to the UE includes different T-CRNTIs or UL grants for different access points or component carriers, and is received by/transmitted to the UE in a specific subframe. In this situation, all involving access points monitor the corresponding UL subframe for message 3 transmission in a coordination way. Please note that, the only one RAR message is determined by the at least one access point according to traffic load, measurement (e.g. reception of the preamble transmission), or predefined rule (e.g. always responded by an access point, or by one of the set of access points). On the other hand, after the UE receives the RAR message(s) including different T-CRNTIs or UL grants for different access points, the UE transmits a UL transmission (e.g. message 3) or a plurality of UL transmissions (e.g. multiple message 3) to the access points according to the received RAR message.

Alternatively, all or each of the RAR messages responded to the UE include the same T-CRNTI or UL grant for different access points or component carriers, or are received by/transmitted to the UE in the same subframe for different access points or component carriers. Or, only one RAR message responded to the UE includes a T-CRNTI or an UL grant for access points or component carriers, or is received by/transmitted to the UE in a specific subframe for the access points or component carriers. On the other hand, after the UE receives the RAR message(s) including the same T-CRNTI or UL grant for different access points, the UE transmits a UL transmission (e.g. message 3) or UL transmissions (e.g. multiple message 3) with distinct modulation and coding schemes (MCSs), distinct reference signal cyclic shift values (e.g. Cell specific or UE specific for demodulation), or an explicit indications (e.g. which access points or component carriers the UE wants) according to the received RAR message. In addition, the UE performs the UL transmission(s) according to measurement (e.g. reception signal strength or channel conditions), cell selection preference, service (e.g. COMP configuration or MBMS service), power control, interference control, positioning, received RAR, UE capability, indication from network, or hearability. Please note that, the UL transmission(s) may include a higher layer message (e.g. supported bandwidth capability or MAC/RRC layer message).

Therefore, after the network receives the UL transmission, the at least one access points determines which access points or component carriers the UE accesses (or would like to access) according to accessed UL transmission resources (e.g. reception times or frequencies of UL transmissions), used T-CRNTIs, used MCSs, used reference signal cyclic shift values), or explicit indications. Then, the at least one access point responds a DL message (e.g. contention resolution message) including assigned access points or component carriers, to the UE. Please note that, the assigned access points or component carriers are decided by the at least one access point according to UE capability, traffic load, measurement, power control, interference control, or predefined rule (e.g. only the UE accessing to a specific access point at the moment wins the contention resolution).

Figure 5:
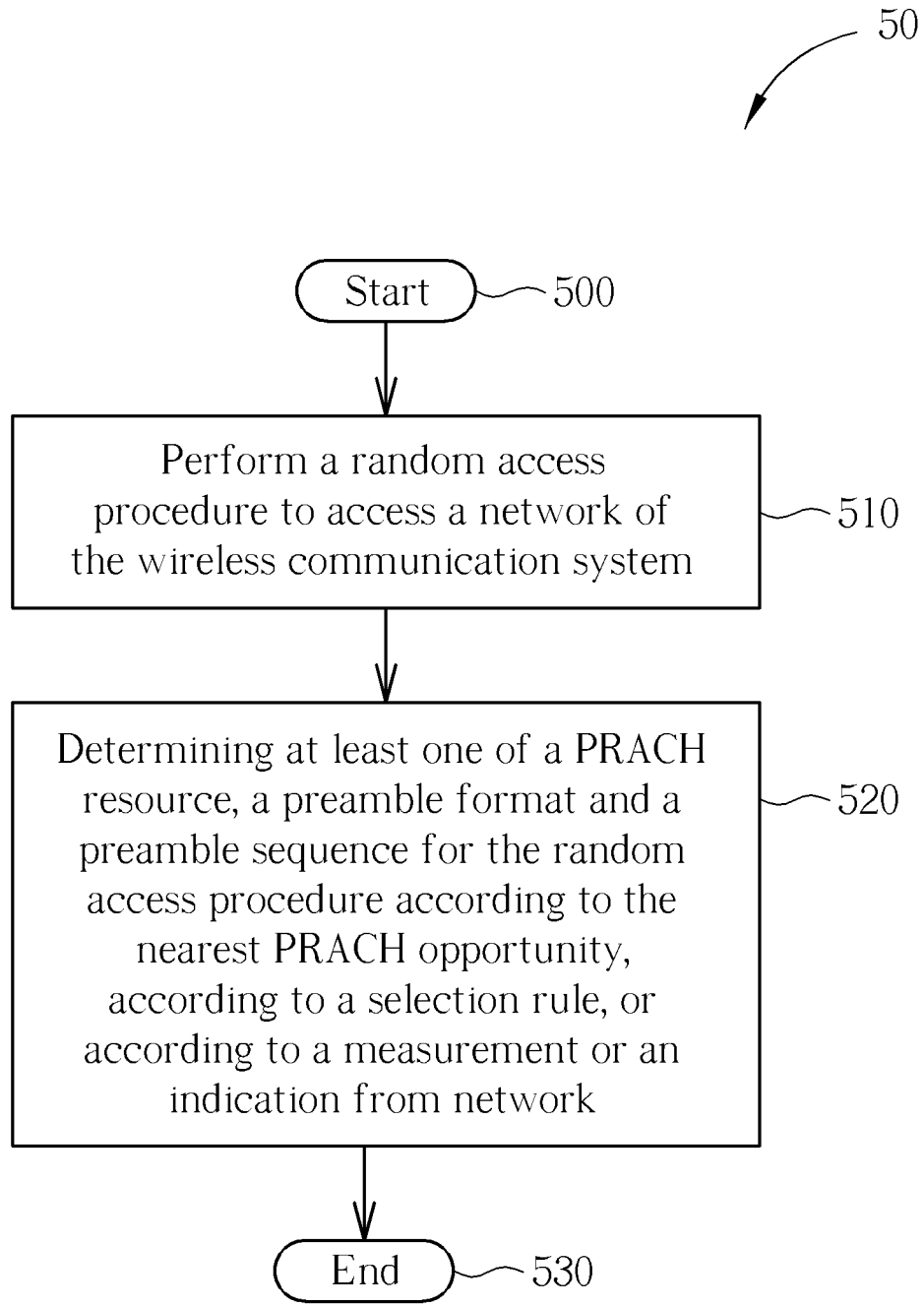

Based on the process 40, the UE may take a corresponding action. Please refer to FIG. 5, which illustrates a flowchart of an exemplary process 50. The process 50 is utilized in a UE of a wireless communications system for handling a random access procedure. The process 50 may be compiled into the program code 214 and includes the following steps:

Step 500: Start.

Step 510: Perform a random access procedure to access a network of the wireless communication system.

Step 520: Determining at least one of a PRACH resource, a preamble format and a preamble sequence for the random access procedure according to the nearest PRACH opportunity, according to a selection rule, or according to a measurement or an indication from network.

Step 530: End.

According to the process 50, the UE decides to use which PRACH resources, preamble formats, and preamble sequences to access according to the nearest PRACH opportunity, according to PRACH configuration/selection rule, or according to measurement or indication from network, so as to perform random access to the plurality of access points/component carriers configured with different PRACH resources, preamble formats, or preamble sequences. The detailed description can be referred from the above, so it is not given herein.

Figure 6:
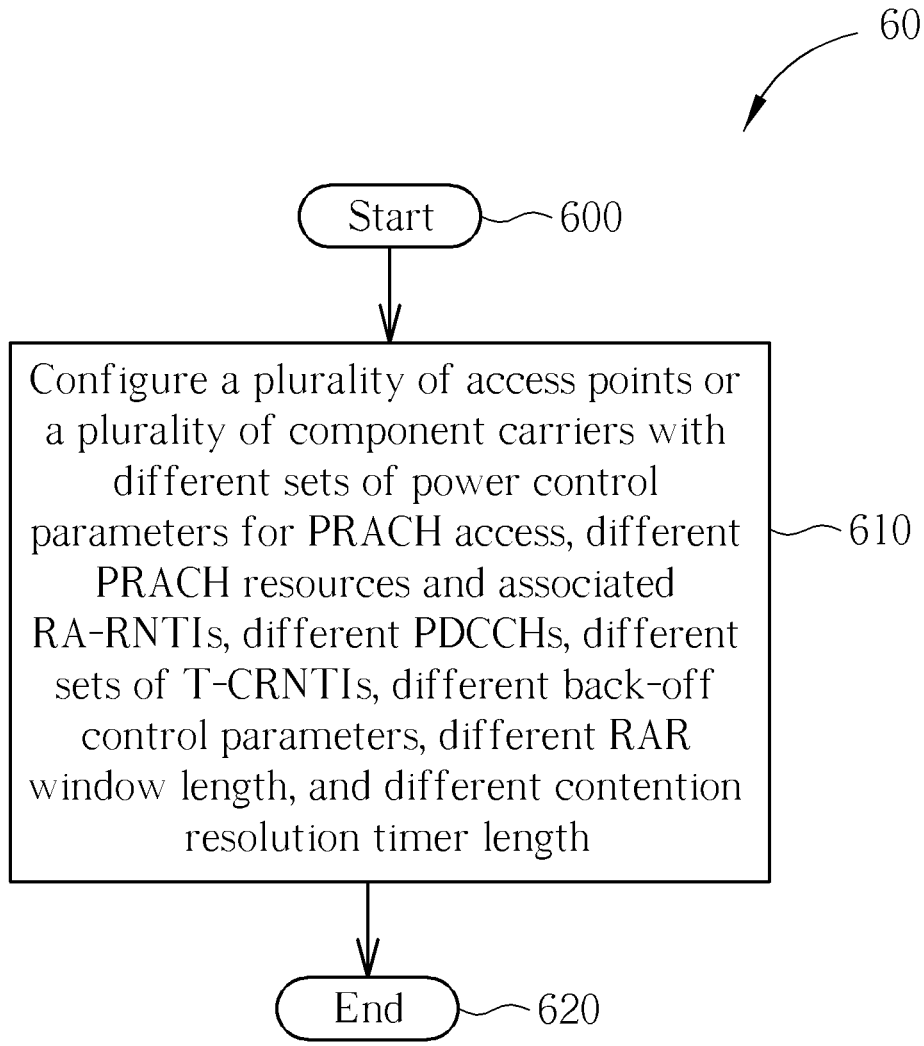

Please refer to FIG. 6, which illustrates a flowchart of an exemplary process 60. The process 60 is utilized in a network of a wireless communications system for handling a random access procedure. The process 60 may be compiled into the program code 214 and includes the following steps:

Step 600: Start.

Step 610: Configure a plurality of access points or a plurality of component carriers with different sets of power control parameters for PRACH access, different PRACH resources and associated RA-RNTIs, different PDCCHs, different sets of T-CRNTIs, different back-off control parameters, different RAR window length, and different contention resolution timer length.

Step 620: End.

According to the process 60, the plurality of access points/coverage/component carriers are configured with different sets of power control parameters for PRACH access, different PRACH resources, RA-RNTIs, different PDCCHs, different sets of T-CRNTIs, different back-off control parameters, different RAR window length, and different contention resolution timer length. Therefore, the UE decides at least one of at least an access point and at least a component carrier to perform at least one random access procedure, and then uses the at least one configuration associated with the at least one of at least an access point and at least a component carrier during the at least one random access procedure.

Please note that, the different back-off control parameters are configured for different DL component carriers/access points/coverage for load balancing at camping or collision/contention alleviation. The abovementioned configuration is based on consideration on traffic load, processing capability, resource scheduling, antenna/transceiver capability, power control, interference control, deployment scenario (e.g. for indoor or outdoor), control resource availability, RNTI availability, or measurement, and may be broadcasted in system information or carried by control signaling.

Figure 7:
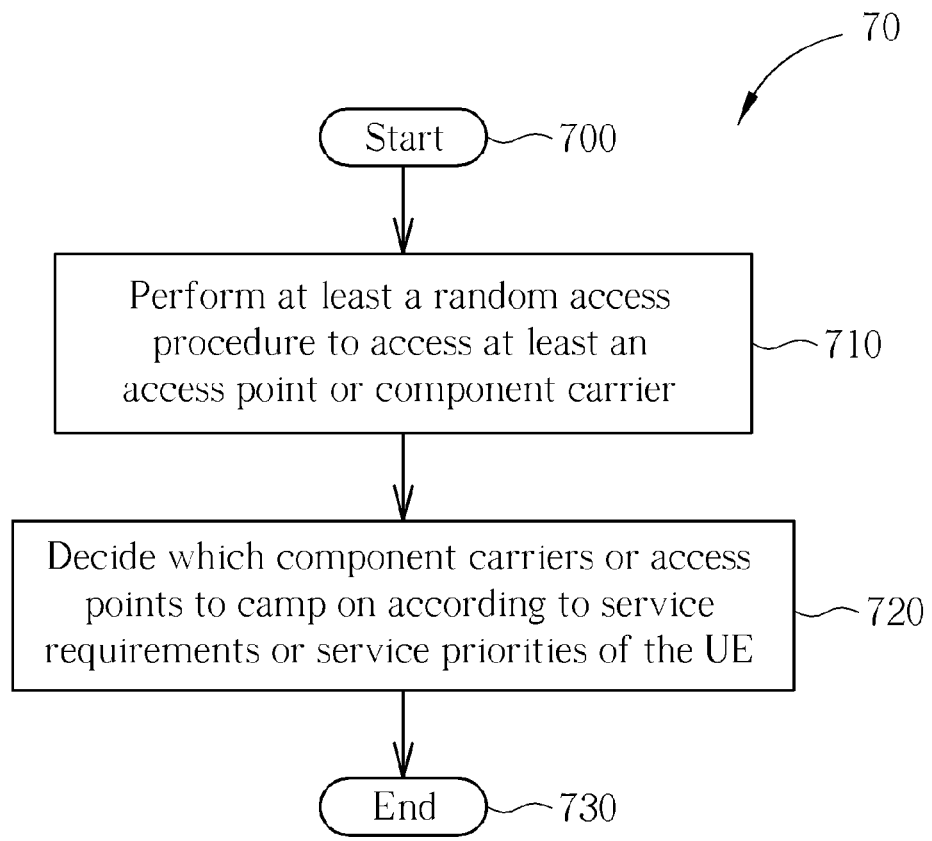

Please refer to FIG. 7, which illustrates a flowchart of an exemplary process 70. The process 70 is utilized in a UE of a wireless communications system for handling a random access procedure. The process 70 may be compiled into the program code 214 and includes the following steps:

Step 700: Start.

Step 710: Perform at least a random access procedure to access at least an access point or component carrier.

Step 720: Decide which component carriers or access points to camp on according to service requirements or service priorities of the UE.

Step 730: End.

According to the process 70, the UE performing the random access procedures can decide which DL component carrier/access point/coverage to camp on according to the service requirement (e.g. real time or non-real time) or priority when the different parameters (e.g. different back-off control parameters) are configured for different DL component carriers/access points/coverage.

Figure 8:
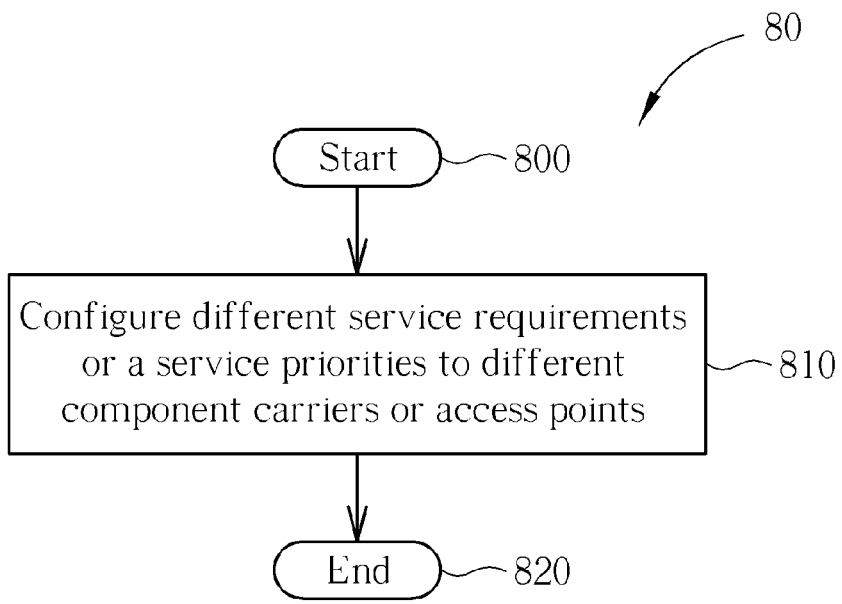

Please refer to FIG. 8, which illustrates a flowchart of an exemplary process 80. The process 80 is utilized in a network of a wireless communications system for handling a random access procedure. The process 80 may be compiled into the program code 214 and includes the following steps:

Step 800: Start.

Step 810: Configure different service requirements or a service priorities to different component carriers or access points.

Step 820: End.

According to the process 80, the network configures service requirements or priorities to the plurality of component carriers or access points, so that the UE performs the random access procedure, according to the configured service requirements and priorities, to which those configuration parameters may be related and accordingly. Therefore, how the UE decides to perform the random access procedure to different component carriers or access points is defined.

Figure 9:
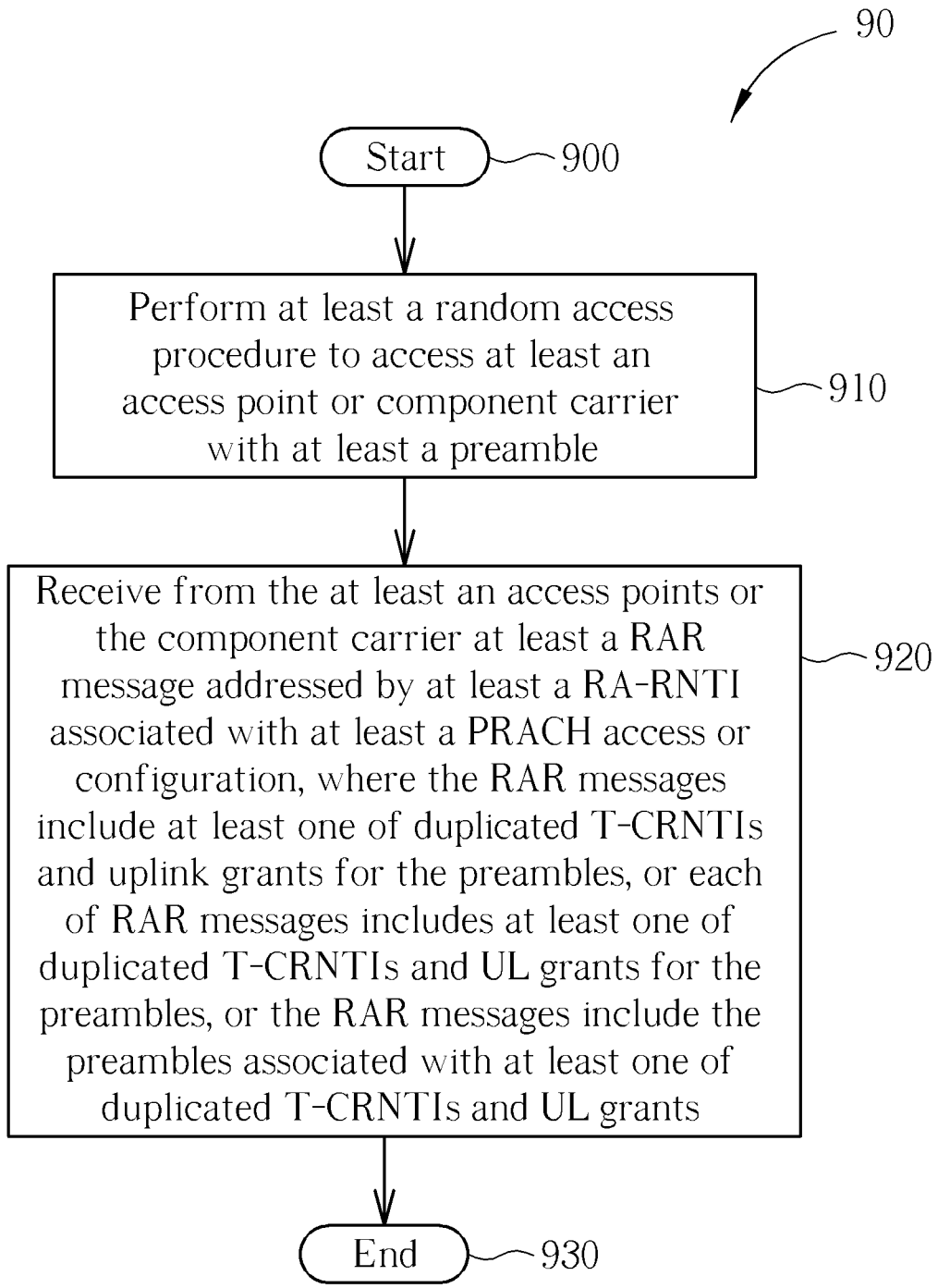

Please refer to FIG. 9, which illustrates a flowchart of an exemplary process 90. The process 90 is utilized in a UE of a wireless communications system for handling a random access procedure. The process 90 may be compiled into the program code 214 and includes the following steps:

Step 900: Start.

Step 910: Perform at least a random access procedure to access at least an access point or component carrier with at least a preamble.

Step 920: Receive from the at least an access points or the component carrier at least a RAR message addressed by at least a RA-RNTI associated with at least a PRACH access or configuration, where the RAR messages include at least one of duplicated T-CRNTIs and uplink grants for the preambles, or each of RAR messages includes at least one of duplicated T-CRNTIs and UL grants for the preambles, or the RAR messages include the preambles associated with at least one of duplicated T-CRNTIs and UL grants.

Step 930: End.

According to the process 90, the UE performing random access procedure receives from network RAR messages addressed by RA-RNTIs associated with PRACH accesses or configuration, where the RAR messages may include duplicated T-CRNTIs or UL grants for different preambles (e.g. different preambles associated with the same T-CRNTI or UL grant), or each of RAR messages includes duplicated T-CRNTIs or UL grants for different preambles (e.g. different preambles in a RAR message are associated with the same T-CRNTI or UL grant), or different RAR messages include different preambles associated with duplicated T-CRNTIs or UL grants (e.g. different preambles carried by different RAR messages are associated with the same T-CRNTI or UL grant). Please note that, the RAR messages may further include indications for indicating that duplicated T-CNRIT or UL grants.

After the UE receives the RAR message including duplicated T-CRNTIs or UL grants, the UE recognizes the duplicated T-CRNTIs or UL grants, and may include explicit indication of access points or component carriers which the UE wants to access in the UL transmission (e.g. message 3). Furthermore, the UE may include the preamble used at PRACH access in the UL transmission. Therefore, after the network receives the UL transmission, the network can assign a new C-RNTI in a contention resolution message (e.g. the UE does not adopt T-CRNTI as C-RNTI due to duplicated T-CRNTIs or UL grants).

Figure 10:
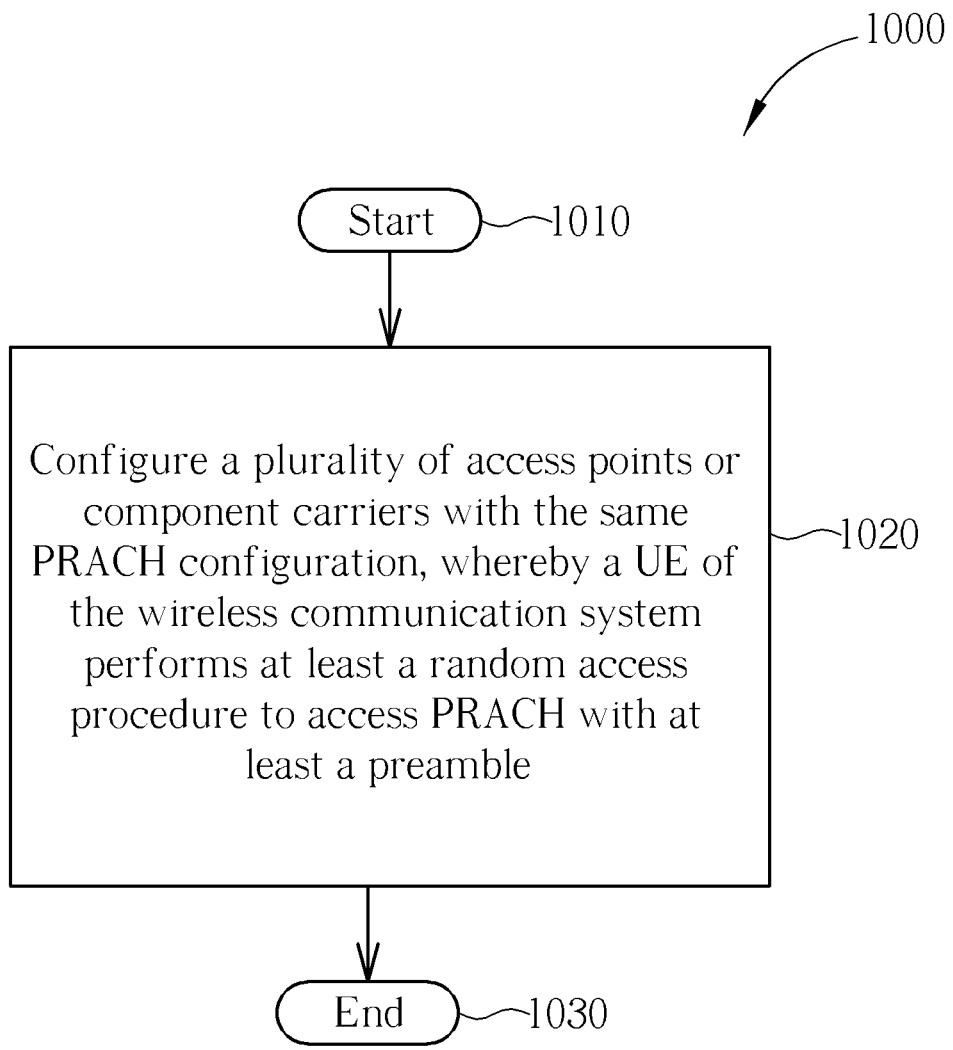

Please refer to FIG. 10, which illustrates a flowchart of an exemplary process 1000. The process 1000 is utilized in a network of a wireless communications system for handling a random access procedure. The process 1000 may be compiled into the program code 214 and includes the following steps:

Step 1010: Start.

Step 1020: Configure a plurality of access points or component carriers with the same PRACH configuration, whereby a UE of the wireless communication system performs at least a random access procedure to access PRACH with at least a preamble.

Step 1030: End.

According to the process 1000, the plurality of access points or component carriers are configured with the same PRACH configuration (e.g. PRACH resource in time or frequency), and the access points or component carriers receiving the preambles from the UE transmit the RAR messages to the UE. On the other hand, the UE know which access points or component carriers transmitting the RAR messages according to the detected RA-RNTIs, allocated T-CRNTIs, or UL grants.

Figure 11:
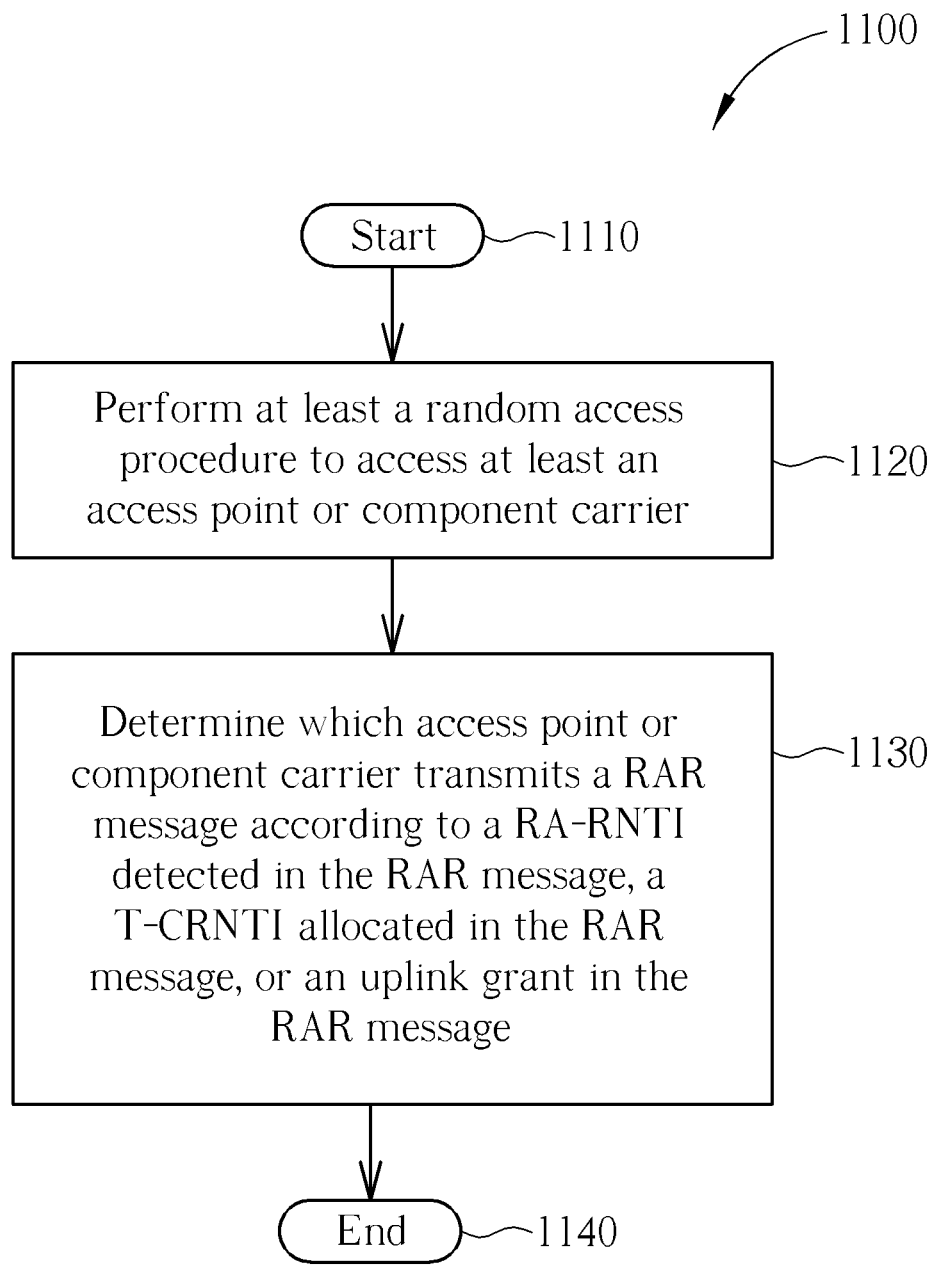

Based on the process 1000, the UE may take a corresponding action. Please refer to FIG. 11, which illustrates a flowchart of an exemplary process 1100. The process 1100 is utilized in a UE of a wireless communications system for handling a random access procedure. The process 1100 may be compiled into the program code 214 and includes the following steps:

Step 1110: Start.

Step 1120: Perform at least a random access procedure to access at least an access point or component carrier.

Step 1130: Determine which access point or component carrier transmits a RAR message according to a RA-RNTI detected in the RAR message, a T-CRNTI allocated in the RAR message, or an uplink grant in the RAR message.

Step 1140: End.

According to the process 1100, the UE determines which access points or component carriers configured with the same PRACH configuration transmit the RAR messages according to detected RA-RNTIs, allocated T-CRNTIs, or UL grants in the RAR messages. Therefore, the UE can respond the UL transmission (e.g. message 3) to the corresponding access points or component carriers. The detailed description can be referred from above, so it is not given herein.

Figure 12:
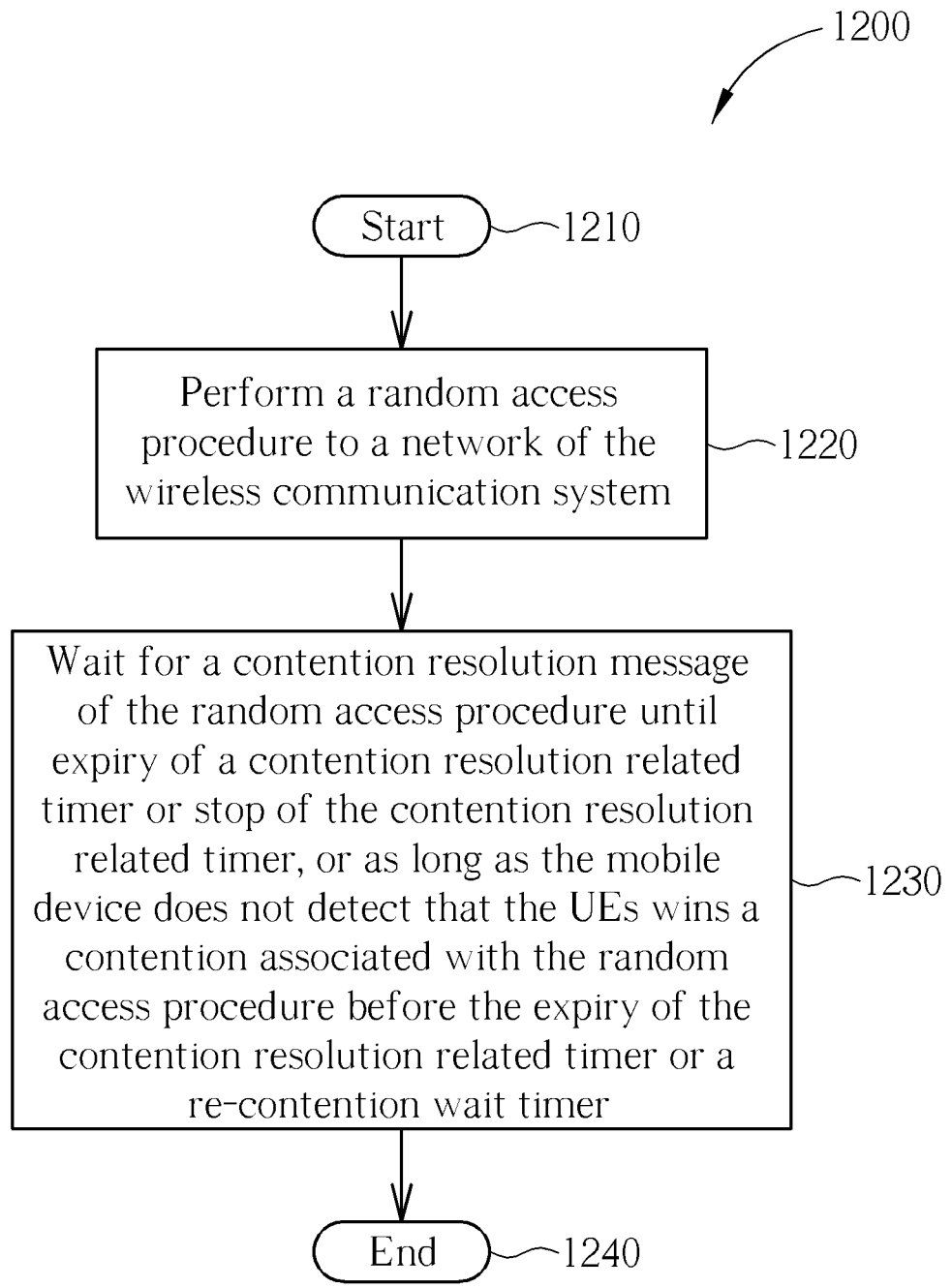

Please refer to FIG. 12, which illustrates a flowchart of an exemplary process 1200. The process 1200 is utilized in a mobile device of a wireless communications system for handling a random access procedure. The process 1200 may be compiled into the program code 214 and includes the following steps:

Step 1210: Start.

Step 1220: Perform a random access procedure to a network of the wireless communication system.

Step 1230: Wait for a contention resolution message of the random access procedure until expiry of a contention resolution related timer or stop of the contention resolution related timer, or as long as the mobile device does not detect that the UEs wins a contention associated with the random access procedure before the expiry of the contention resolution related timer or a re-contention wait timer.

Step 1240: End.

According to the UE performing random access procedure to the network (e.g. the base station or relay) shall wait for contention resolution message (e.g. message 4) until the expiry of the contention resolution related timer, or the stop of the contention resolution related timer, or as long as the UE does not detect that the winner of a contention before the expiry of the contention resolution related timer or re-contention wait timer. The re-contention wait timer is indicated or preconfigured to the UE to show how long it shall wait after it detects that the UE is lose (e.g. the UE detects T-CRNTI on PDCCH but does not detect its contention resolution identity in contention resolution message or has the C-RNTI).

On the other hand, when the UE has detected a PDCCH addressed by T-CRNTI (e.g. used for its previous UL transmission message 3) before the expiry of the contention resolution related timer which has been initiated upon transmission of its previous UL transmission, but the UE fails at detecting its contention resolution identity in the contention resolution message, or the UE has a C-RNTI (e.g. included in the message 3), the UE continues monitoring PDCCH and wait for contention resolution message.

Please note that, the relay may be non-transparent or transparent to the UE, and the relay has a separated cell identity for coverage, or uses the same cell identity as the cell of the donor base station.

Figure 13:
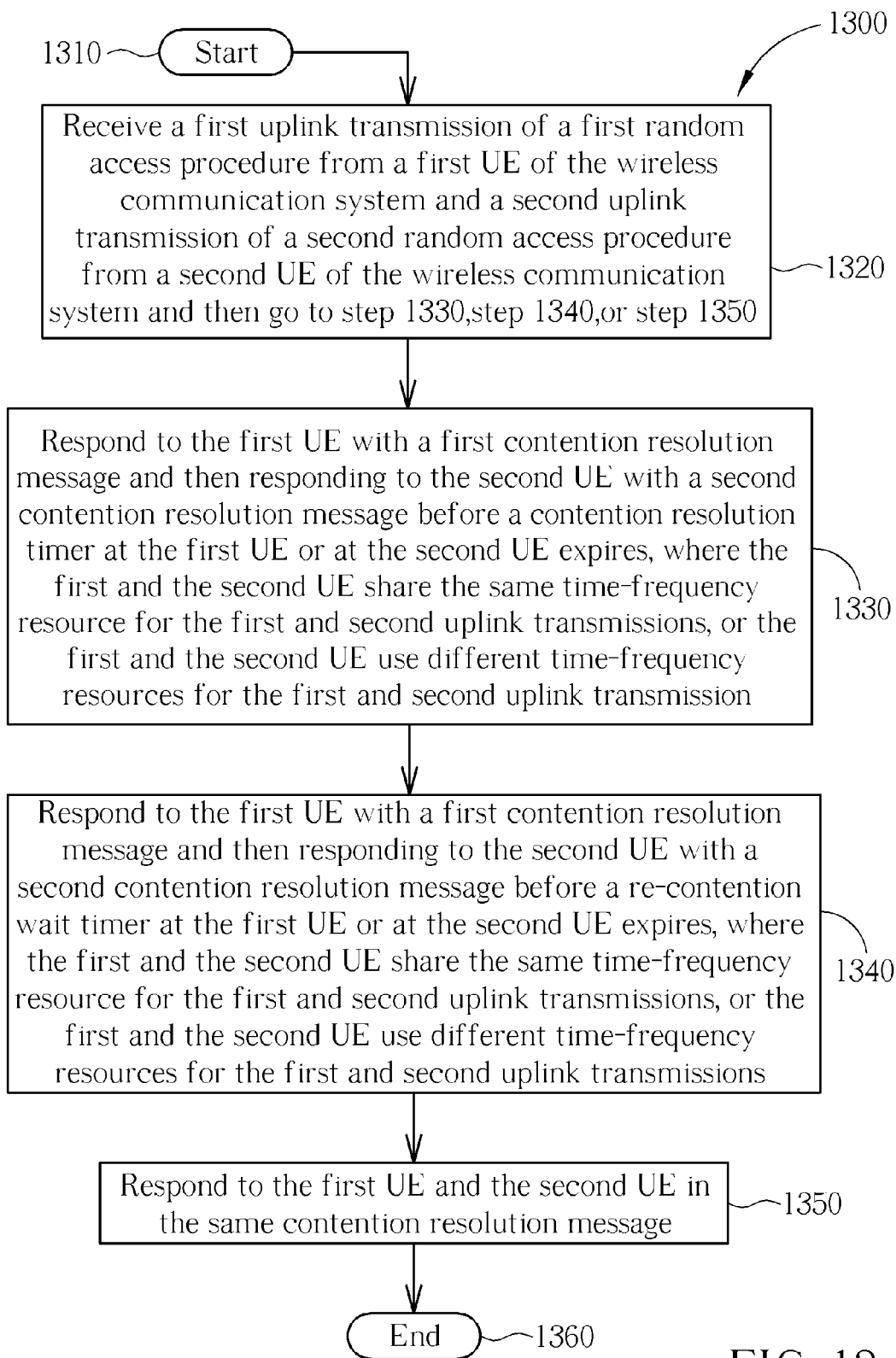

Please refer to FIG. 13, which illustrates a flowchart of an exemplary process 1300. The process 1300 is utilized in a network of a wireless communications system for handling a random access procedure. The process 1300 may be compiled into the program code 214 and includes the following steps:

Step 1310: Start.

Step 1320: Receive a first uplink transmission of a first random access procedure from a first UE of the wireless communication system and a second uplink transmission of a second random access procedure from a second UE of the wireless communication system, and then go to step 1330, step 1340, or step 1350.

Step 1330: Respond to the first UE with a first contention resolution message and then responding to the second UE with a second contention resolution message before a contention resolution timer at the first UE or at the second UE expires, where the first and the second UE share the same time-frequency resource for the first and second uplink transmissions, or the first and the second UE use different time-frequency resources for the first and second uplink transmissions.

Step 1340: Respond to the first UE with a first contention resolution message and then responding to the second UE with a second contention resolution message before a re-contention wait timer at the first UE or at the second UE expires, where the first and the second UE share the same time-frequency resource for the first and second uplink transmissions, or the first and the second UE use different time-frequency resources for the first and second uplink transmissions.

Step 1350: Respond to the first UE and the second UE in the same contention resolution message.

Step 1360: End.

According to the process 1300, the network (e.g. a base station or a relay) can respond to the first UE with the first contention resolution and then respond to the second UE with the second resolution (e.g. and so on for further contention resolution later so as to have re-contention on the same time-frequency resource but different response timing) before the contention resolution timer or the re-contention wait timer at each UE expires for each UE. Please note that, the first and the second UE may share the same time-frequency resource for the each own message 3 UL transmission, or may use the different time or frequency resources for the each own message 3 UL transmission.

In addition, the contention resolution messages for the UEs can include new assigned RNTIs (e.g. C-RNTI) to the UE (e.g. the first or the second UE) as its C-RNTI.

Alternatively, the network responds to the first UE and the second UE in the same contention resolution message, where the first UE and the second UE perform each own random access procedure, and can recognize its own part of contention resolution content in the same contention resolution message. Please note that, the first UE and the second UE share the same T-CRNTI, and may use the same PRACH resource and preamble.

In addition, the contention resolution message includes coverage identification (e.g. cell identity, access entity indication, or relay ID) for each UE. Therefore, each UE in the same contention resolution message can access PRACH on different areas of coverage.

RIEF DE

Figure 14:
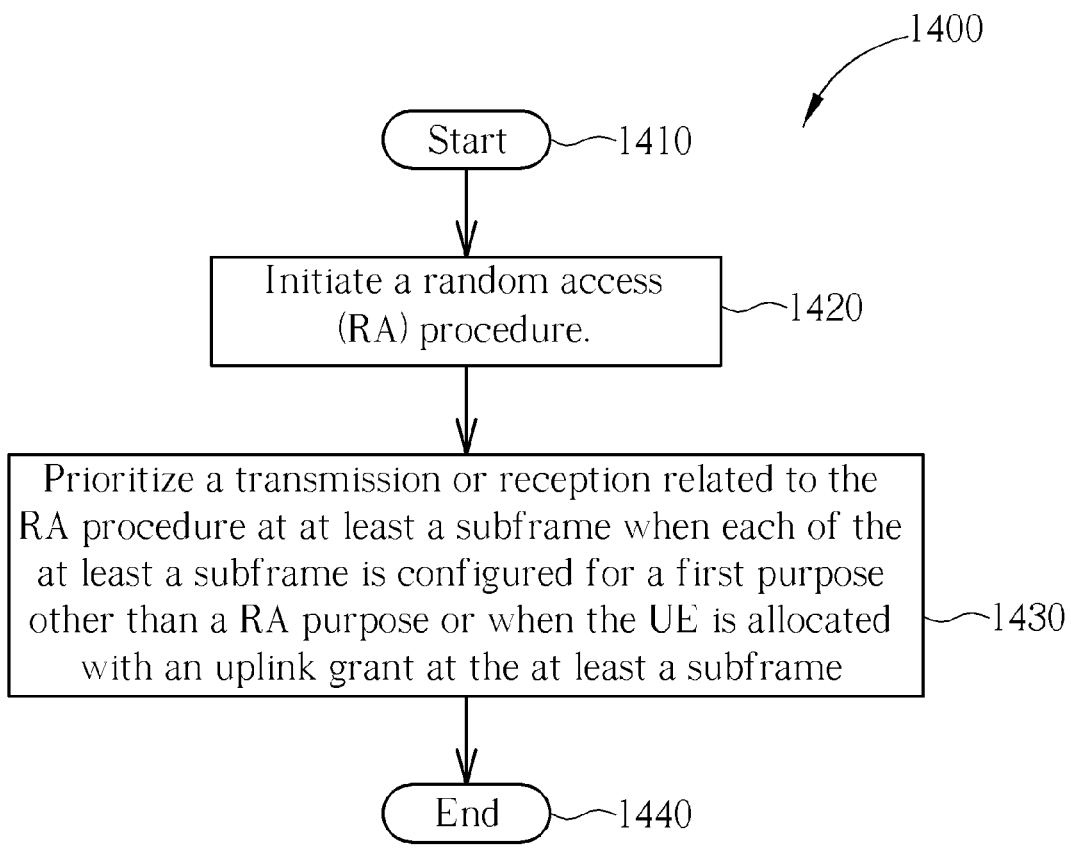

Please refer to FIG. 14, which illustrates a flowchart of an exemplary process 1400. The process 1400 is utilized in a UE of a wireless communications system for handling a random access procedure. The process 1400 may be compiled into the program code 214 and includes the following steps:

Step 1410: Start.

Step 1420: Initiate a random access (RA) procedure.

Step 1430: Prioritize a transmission or reception related to the RA procedure at at least a subframe when each of the at least a subframe is configured for a first purpose other than a RA purpose or when the UE is allocated with an uplink grant at the at least a subframe.

Step 1440: End.

According to the process 1400, during the RA procedure, the UE prioritizes the transmission or reception related to RA procedure (e.g. preamble transmission, RAR reception, message 3 UL transmission, and contention resolution message reception) at the subframe when the subframe is preconfigured or dynamically configured by the network (e.g. a base station or relay), or the subframe is allocated with the UL grant by the network.

Moreover, the subframe may be configured as a MBSFN subframe or a blank subframe (namely no data and control information is transmitted) to the UE for in-band relaying operation purpose (e.g. during the subframe the UE does not expect any downlink transmission due to base station to the relay transmission). However, based on the process 1500, the UE shall monitor a downlink (DL) channel (e.g. PDCCH and then Physical Downlink Shared Channel (PDSCH)) for the RAR reception during the subframe (e.g. the MBSFN subframe or blank subframe) when a RAR window does not expire or does not stop, or for the contention resolution message reception (e.g. message 4) during the MBSFN subframe or blank subframe when contention resolution reception related timer (e.g. RRC connection/(re)establishment related timer or handover related timer) does not expire or does not stop. On the other hand, the UE does not expect a DL transmission related to the RA procedure if no RA procedure is ongoing or when the RA procedure has been finished.

Please note that, the UE is under coverage of the relay, which can be transparent or non-transparent to the UE, and may have a separated cell identity for its coverage, or use the same cell identity as the cell of the donor base station. Moreover, an access link between relay and UE is affected by a backhaul link between base station and relay, whereas the backhaul link is affected by the access link due to inband relaying operation. For example, due to inband relaying operation, a first transmission in the access link may not be successfully performed when a second transmission is performed in the backhaul link. While relay and UE involve in the random access procedure performed by the UE, the random access procedure can also be performed by the relay on the backhaul link between base station and relay. In other words, the relay, as also a mobile device, can reuse UE's random access procedure and play a role similar to the UE while performing random access procedure with the base station (e.g. base station to the relay is similar to the relay to the UE or base station to the UE). Therefore, in this article, the behavior associated with the random access procedure performed by the UE to the base station or the relay may be also applied for the relay to the base station. Please note that, the relay is under coverage of the base station when the relay plays the role as the mobile device.

In addition, the UE may stop waiting for the RAR reception prior to the expiry of the RAR window when the rest time of the RAR window is overlapped with the subframe, or may skip monitoring the RAR reception prior to the expiry of the RAR window during the subframe, or may stop the RAR window. On the other hand, the UE may stop waiting for the contention resolution message reception prior to the expiry of the contention resolution reception related timer when the rest time of the timer is overlapped with the subframe, or may skip monitoring the contention resolution message reception prior to the expiry of the timer during the subframe, or may stop the timer when the mobile device stops waiting for the contention resolution message.

Figure 15:
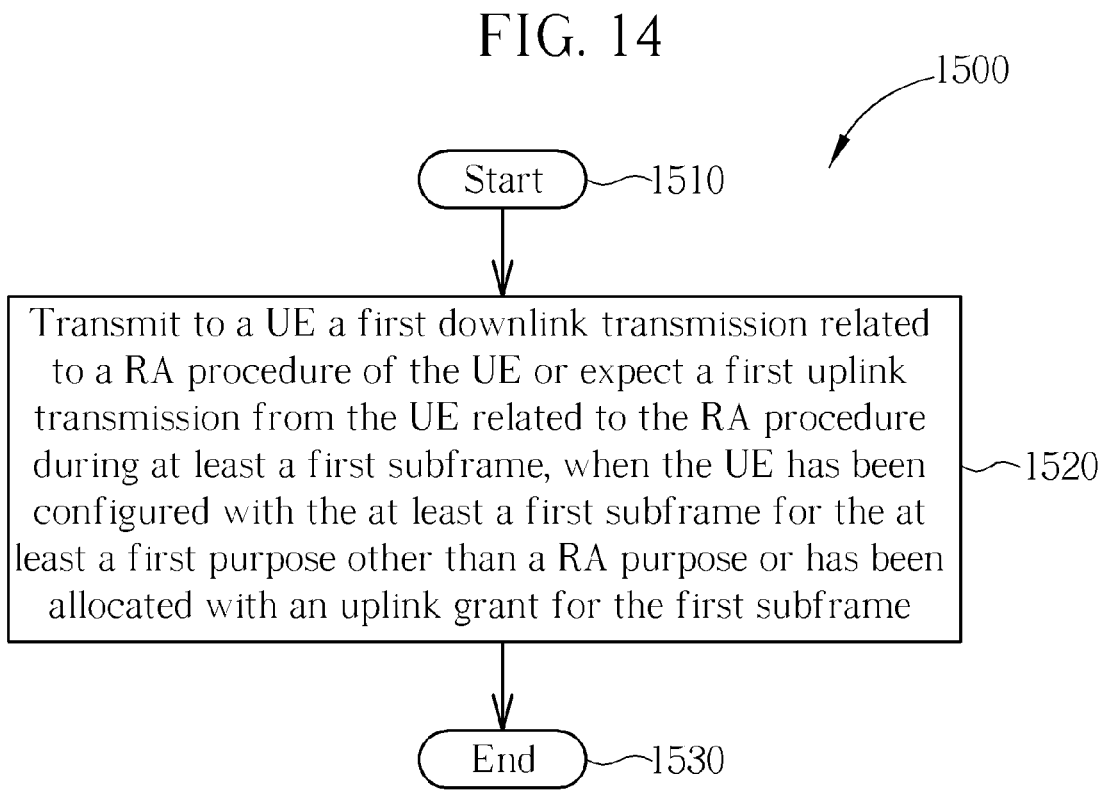

Please refer to FIG. 15, which illustrates a flowchart of an exemplary process 1500. The process 1500 is utilized in a network of a wireless communications system for handling a random access procedure. The process 1500 may be compiled into the program code 214 and includes the following steps:

Step 1510: Start.

Step 1520: Transmit to a UE a first downlink transmission related to a RA procedure of the UE or expect a first uplink transmission from the UE related to the RA procedure during at least a first subframe, when the UE has been configured with the at least a first subframe for the at least a first purpose other than a RA purpose or has been allocated with an uplink grant for the first subframe.

Step 1530: End.

According to the process 1500, the network (e.g. the base station or the relay) transmits the first DL transmission (e.g. a RAR or a contention resolution) to the UE or expects the first UL transmission (e.g. message 3, such as handover complete or RRC connection (re)establishment request) from the UE related to the RA procedure when the UE has been configured with the first subframe for the first purpose other than the RA purpose or has been allocated with the uplink grant for the first subframe.

Please note that, the UE is under coverage of the relay, which can be transparent or non-transparent to the UE, and may have a separated cell identity for its coverage, or use the same cell identity as the cell of the donor base station.

In addition, the network prioritizes the first DL transmission or the first UL transmission related to the RA procedure of the UE during the first subframe. Furthermore, the network allocates UL grant for reception of the first UL transmission from the UE during the first subframe or signals feedback associated to the first UL transmission to the UE during the first subframe.

Please note that, based on the process 1600, the network can control the base station to perform a second DL transmission to the relay during the first subframe, or control the relay to perform a second UL transmission to the base station during the first subframe. On the other hand, the network transmits PDCCH or PDSCH during the first subframe, and thereby the UE monitors the PDCCH or PDSCH during the first subframe.

Figure 16:
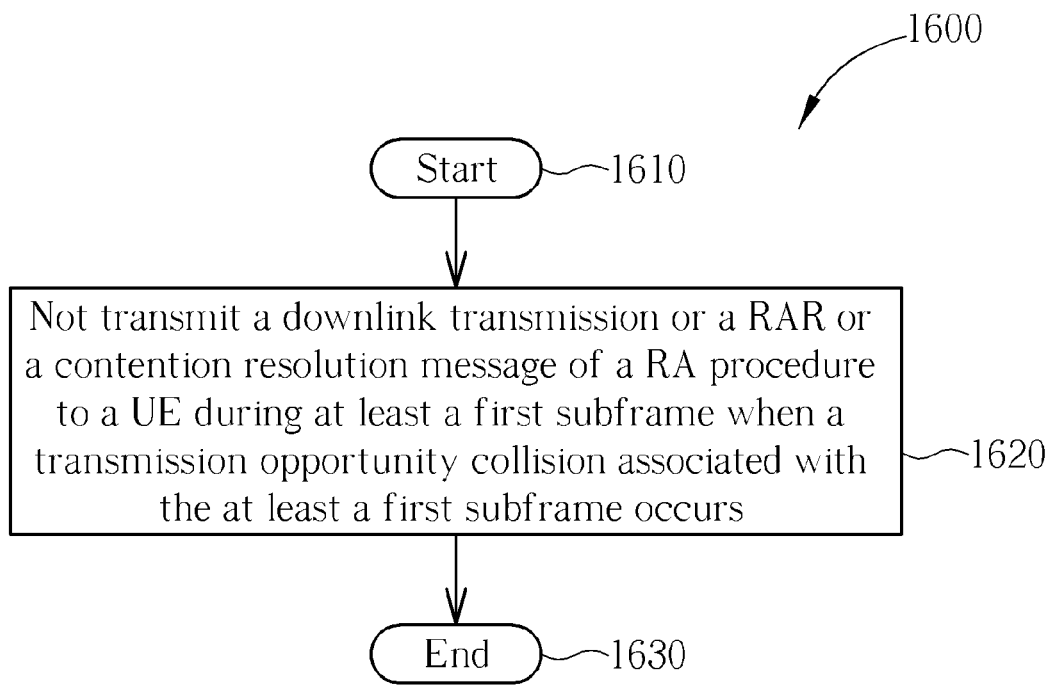

Please refer to FIG. 16, which illustrates a flowchart of an exemplary process 1600. The process 1600 is utilized in a network of a wireless communications system for handling a random access procedure. The process 1600 may be compiled into the program code 214 and includes the following steps:

Step 1610: Start.

Step 1620: Not transmit a downlink transmission or a RAR or a contention resolution message of a RA procedure to a UE during at least a first subframe when a transmission opportu nity collision associated with the at least a first subframe occurs.

Step 1630: End.

According to the process 1600, during the RA procedure performed by the UE, the network shall not transmit the downlink transmission, the RAR or the contention resolution message at DL to the UE during the at least a first subframe when the at least a first subframe is configured for a purpose other than a RA purpose, or corresponds to an UL transmission (e.g. message 3) at a second subframe colliding with the first subframe, or the UE indicates a third subframe for the UL transmission colliding with the first subframe. On the other hand, the network transmits the RAR to the UE during the first subframe when the UE does not indicate a fourth subframe for the UL transmission colliding with the first subframe.

Alternatively, the UE does not schedule uplink transmission or uplink transmission of the RA procedure to the mobile device during at least a second subframe. For example, when the UE receives a RAR at subframe n, the UE or the relay may transmit a message 3 UL transmission at subframe n+6. However, due to inband relaying operation, the UE may postpone the transmission at subframe n+K, where K is equal or larger than 6.

Please note that, the UE is under coverage of a relay, which is transparent or non-transparent to the UE, and may has a separated cell identity for its coverage, or use the same cell identity as the cell of the donor base station. In addition, the RAR includes a field that indicates the third subframe, the fourth subframe, or a UL grant for the UL transmission.

Moreover, the first subframe is a MBSFN subframe or blank subframe (e.g. no data and control information) for in-band relaying operation purpose. Therefore, the first subframe may be used for the relay transmission at UL to the base station, or is indicated to the UE that the first subframe is used for the relay transmission at UL to the base station (e.g. indicated to the UE by system information or control signalling), or is used for a specific purpose (e.g. prevents from/prohibits UL transmission from the UE) other than the RAR transmission purpose. In this situation, the UE knows the first subframe and prioritizes the UL transmission (e.g. message 3) at the first subframe(s) (e.g. the message 3 has higher priority so that UE transmit the message 3 even though normal UL transmission shall be blocked at the first subframe) when the network indicates the UE to transmit UL transmission during the first subframe or the reception of RAR by the UE from the network corresponds to the UL transmission at the subframe that collides with the first subframe. After that, the network (e.g. the relay or the base station) may receive and forward the UL transmission, or may ignore the UL transmission. Alternatively, the UE knows the first subframe and does not transmit the UL transmission (e.g. message 3) at the first subframe (e.g. UL transmission shall be blocked at the first subframe) when the network indicates the UE to transmit UL transmission during the first subframe or the reception of RAR by the UE from the network corresponds to the UL transmission at the subframe that collides with the first subframe.

Furthermore, the network allocates a first PRACH resource corresponding to a first preamble access to the base station or the relay, and a second PRACH resource corresponding to a second preamble access to the base station or relay, so that the UE monitors the RAR addressed by a first RA-RNTI corresponding to the first preamble access and by a second RA-RNTI corresponding to the second preamble access, where the first and second RA-RNTIs indicate a fifth subframe (e.g. A subframe) later after reception where A could be pre-mapped to the RA-RNTI by configuration) for UL transmission of the UL grant in the RAR.

Figure 17:
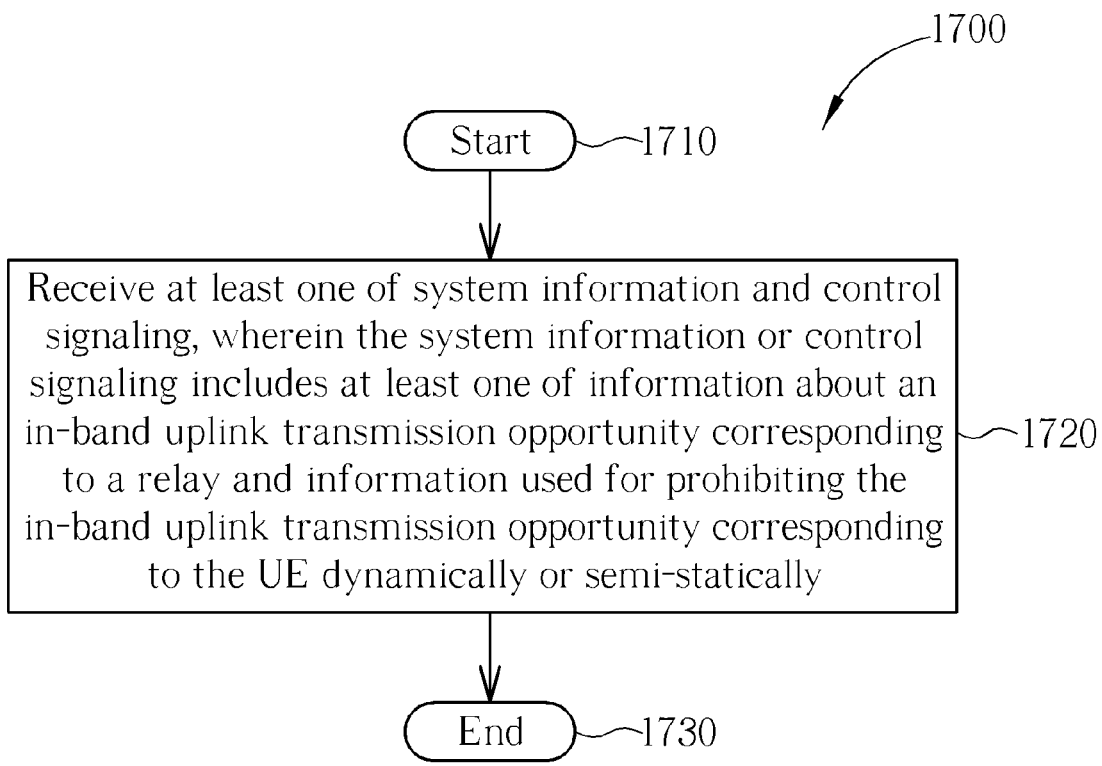

Please refer to FIG. 17, which illustrates a flowchart of an exemplary process 1700. The process 1700 is utilized in a UE of a wireless communications system for handling a random access procedure. The process 1700 may be compiled into the program code 214 and includes the following steps:

Step 1710: Start.

Step 1720: Receive at least one of system information and control signaling, wherein the system information or control signaling includes at least one of information about an in-band uplink transmission opportunity corresponding to a relay and information used for prohibiting the in-band uplink transmission opportunity corresponding to the UE dynamically or semi-statically.

Step 1730: End.

According to the process 1700, a relay or a base station indicates to the UE the in-band UL transmission opportunity corresponding to the relay or information used for prohibiting UL transmission opportunity corresponding to the UE dynamically or semi-statically through system information or control signaling from the relay or the base station. As a result, the UE does not apply UL grant for UL transmission at the in-band UL transmission opportunity, or applies an UL grant for the in-band UL transmission at a first subframe which corresponds to a second subframe later after the in-band UL transmission opportunity.

Please note that, the second subframe is indicated in a RAR during performance of a random access procedure of the UE, and may be indicated through system information or control signaling. Moreover, the second subframe is indicated according to a PRACH configuration or a RA-RNTI addressing the received RAR at UE, or is a predefined value.

Figure 18:
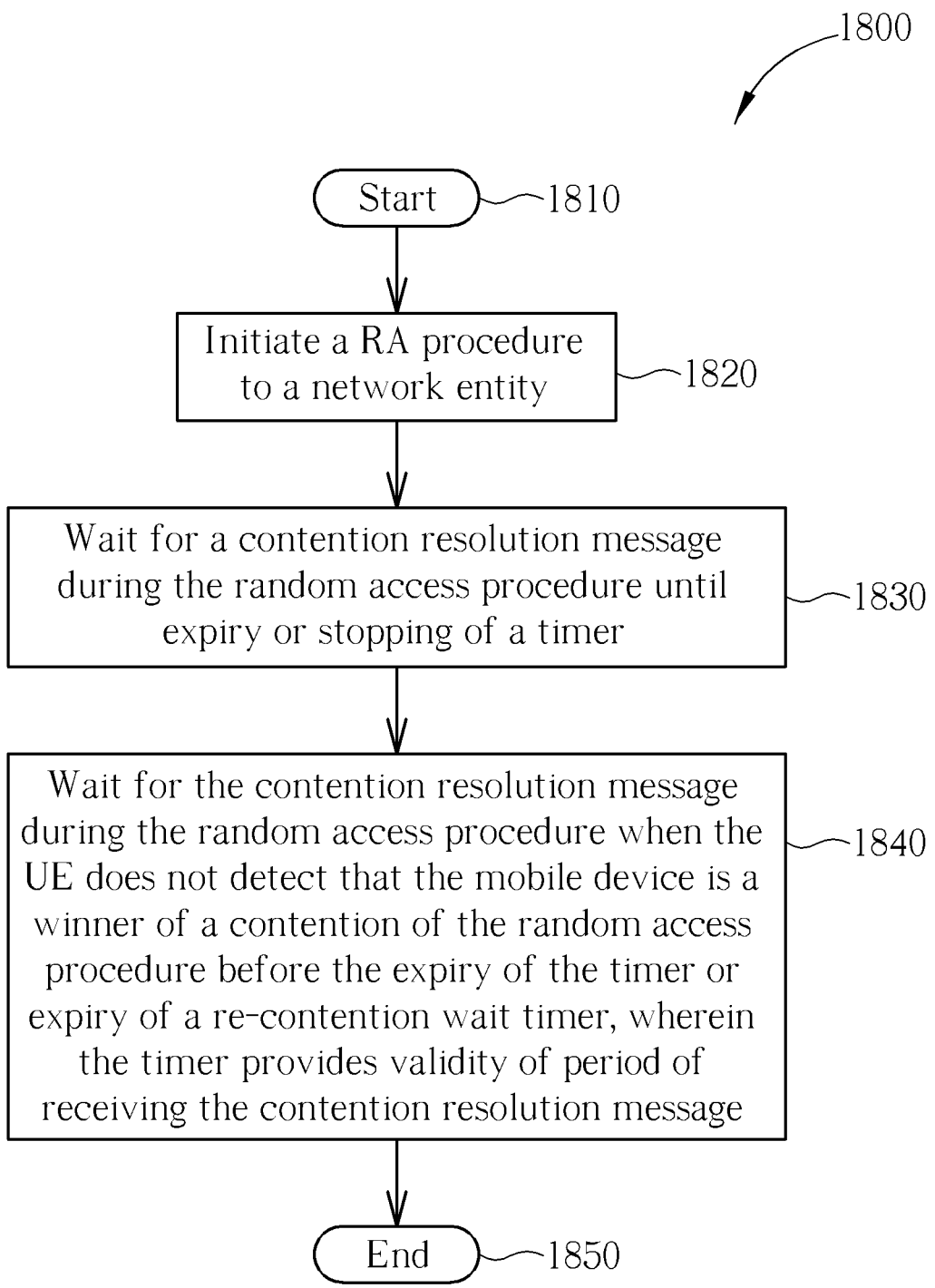

Please refer to FIG. 18, which illustrates a flowchart of an exemplary process 1800. The process 1800 is utilized in a UE of a wireless communications system for handling a random access procedure. The process 1800 may be compiled into the program code 214 and includes the following steps:

Step 1810: Start.

Step 1820: Initiate a RA procedure to a network entity.

Step 1830: Wait for a contention resolution message during the random access procedure until expiry or stopping of a timer.

Step 1840: Wait for the contention resolution message during the random access procedure when the UE does not detect that the mobile device is a winner of a contention of the random access procedure before the expiry of the timer or expiry of a re-contention wait timer, wherein the timer provides validity of period of receiving the contention resolution message.

Step 1850: End.

According to the process 1800, the UE performing random access procedure to the network (e.g. a base station or a relay) waits for contention resolution message (e.g. message 4) until the expiry of the contention resolution related timer or the stop of the contention resolution related timer (e.g. C-RNTI of the UE on PDCCH or contention resolution identity of the UE on Downlink Shared Channel (DL-SCH) has been detected), or as long as the UE does not detect that it's the winner of a contention before the expiry of the contention resolution related timer or re-contention wait timer.

Please note that, the relay is non-transparent or transparent to the UE, and may have a separated cell identity for its coverage, or uses the same cell identity as the cell of the donor base station. Moreover, the re-contention wait timer is indicated or preconfigured to the UE to show how long it shall wait after it detects it's a loser (e.g. detects its T-CRNTI on PDCCH but does not detect its contention resolution identity in contention resolution message or it has C-RNTI).

In addition, when the UE has detected a PDCCH addressed by its T-CRNTI (e.g. used for its previous UL transmission message 3) before the expiry of the contention resolution related timer which has been initiated upon transmission of its previous UL transmission, but the UE fails at detecting its contention resolution identity in the contention resolution message, or the UE has a C-RNTI (e.g. included in the message 3), the UE continues monitoring PDCCH and wait for contention resolution message.

Figure 19:
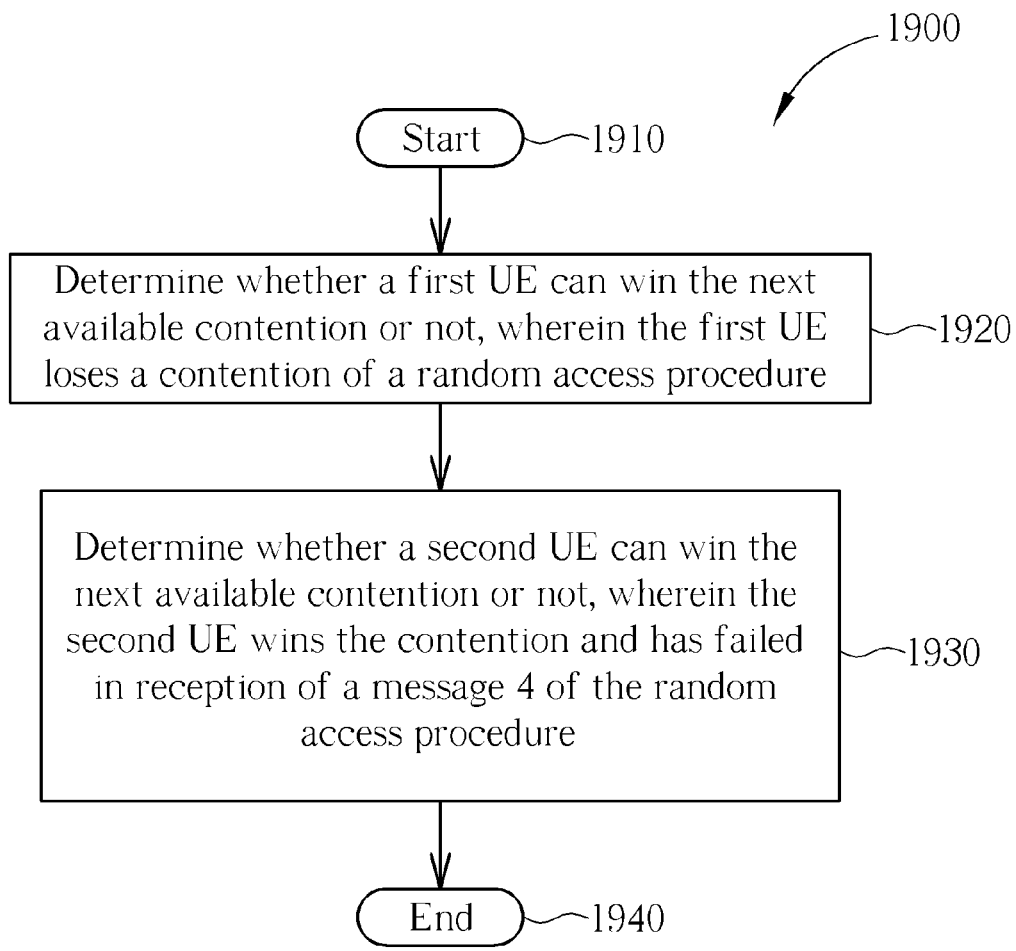

Please refer to FIG. 19, which illustrates a flowchart of an exemplary process 1900. The process 1900 is utilized in a network of a wireless communications system for handling a random access procedure. The process 1900 may be compiled into the program code 214 and includes the following steps:

Step 1910: Start.

Step 1920: Determine whether a first UE can win the next available contention or not, wherein the first UE loses a contention of a random access procedure.

Step 1930: Determine whether a second UE can win the next available contention or not, wherein the second UE wins the contention and has failed in reception of a message 4 of the random access procedure.

Step 1940: End.

According to the process 1900, the network is allowed to reconsider whether the losers can win the next available contention (possible at next transmission of contention resolution message) or not. The network can also be allowed to reconsider whether the intended winner who failed at message 4 reception (e.g. reach maximum number of retransmission) can win the next available contention (possible at next transmission of contention resolution message) or not.

For example, when the network does not receive an acknowledgement (ACK) of contention resolution message from a winner UE, the network may reconsider whether the winner UE can win the re-contention (next available contention or current contention retransmission). Alternatively, around the time instant when the network receives the ACK, the network reconsiders whether a loser UE can win the re-contention no matter whether is received or not. The network is a relay node or base station. In addition, the network is a relay or a base station. The relay may be non-transparent or transparent to the UE, and may have a separated cell identity for its coverage, or uses the same cell identity as the cell of the donor base station.

Please note that, a contention resolution can be issued by RRC message or MAC control signaling (e.g. L1/L2 control signaling or MAC control PDU) for different access events. In addition, a RRC contention resolution message shall be in general form, such as "RRC connection change command" message possible with NAS message or specific "RRC contention resolution" message, for both contention and re-contention at least for initial access events.

Moreover, in case of handover, message 3 and message 4 can be contained in "UL information transfer message" and "RRC connection change command" respectively. In case of scheduling request, message 3 and 4 can be sent with MAC signaling or RRC message.

Figure 20:
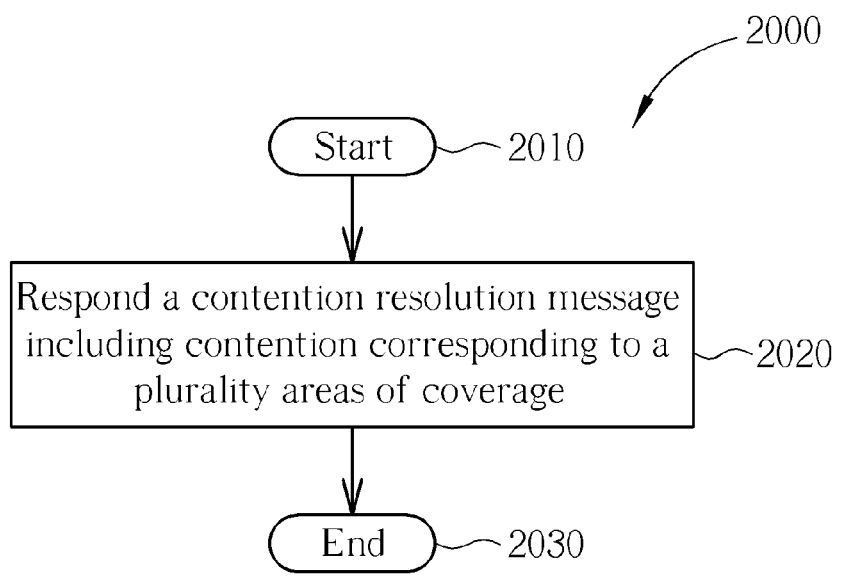

Please refer to FIG. 20, which illustrates a flowchart of an exemplary process 2000. The process 2000 is utilized in a network of a wireless communications system for handling a random access procedure. The process 2000 may be compiled into the program code 214 and includes the following steps:

Step 2010: Start.

Step 2020: Respond a contention resolution message including contention corresponding to a plurality areas of coverage Step 2030: End.

According to the process 2000, the network responds contention resolution message consisting of contention(s) in more than one area of coverage (e.g. two cells, or cell of base station and coverage of the relay node) to UE(s). The relay may be non-transparent or transparent to the UE, and may have a separated cell identity for its coverage, or uses the same cell identity as the cell of the donor base station.

Please note that, the network is a relay or a base station. The relay may be non-transparent or transparent to the UE, and may have a separated cell identity for its coverage, or uses the same cell identity as the cell of the donor base station.

Figure 21:
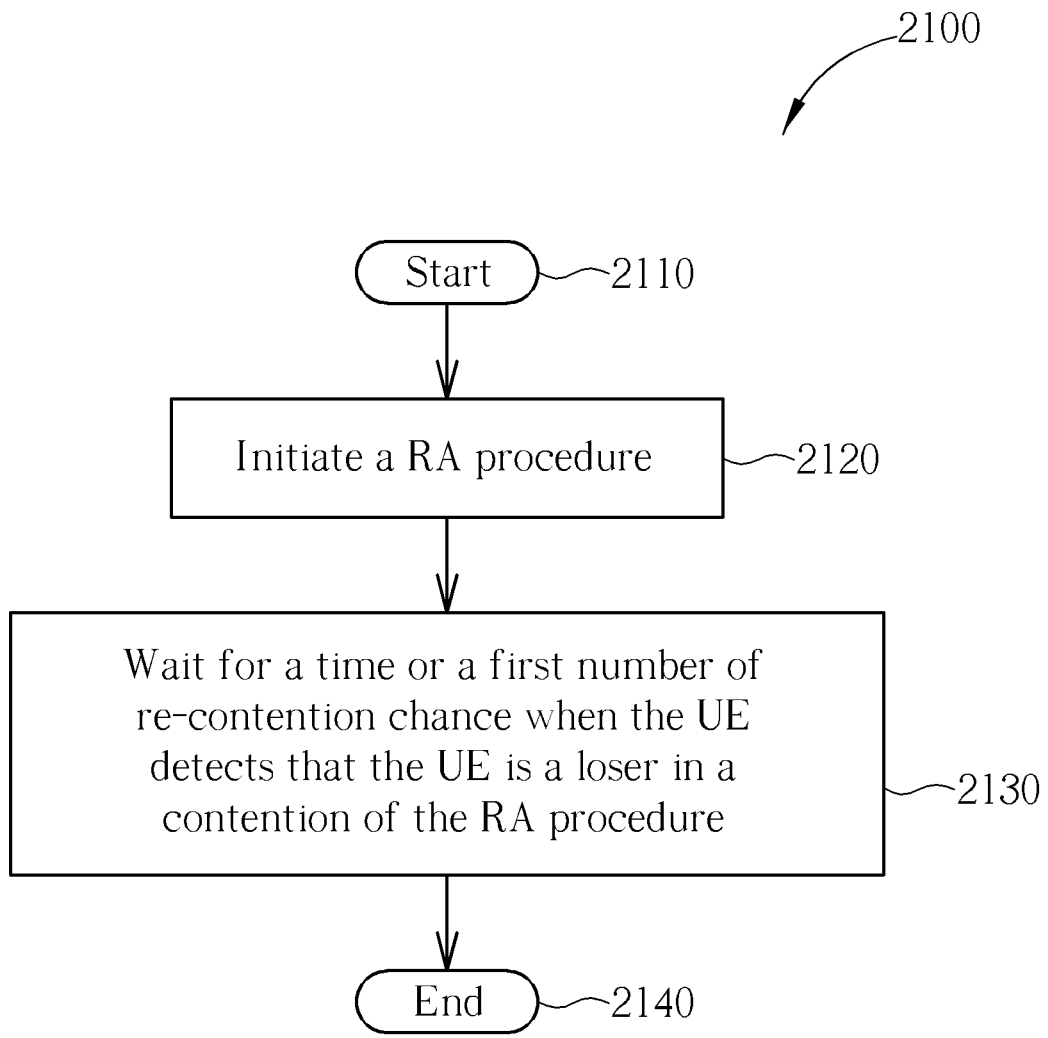

Please refer to FIG. 21, which illustrates a flowchart of an exemplary process 2100. The process 2100 is utilized in a UE of a wireless communications system for handling a random access procedure. The process 2100 may be compiled into the program code 214 and includes the following steps:

Step 2110: Start.

Step 2120: Initiate a RA procedure.

Step 2130: Wait for a time or a first number of re-contention chance when the UE detects that the UE is a loser in a contention of the RA procedure.

Step 2140: End.

According to the process 2100, the UE detecting itself as a loser or unsuccessfully received a message 4 (or didn't detect C-RNTI on control channel if there is one) considering itself as a potential winner may wait for next contention resolution (with or without indication in RRC message or MAC control signalling) or certain period of time.

Take examples based on the process 2100. In the first example, when the UE detects itself as a loser in the contention by a certain method, the UE waits for a period of time or a configured number of re-contention chance. The certain method can be reception of indication of re-contention (being judged as loser this time) or find addressing control information on control channel but no UE identity is detected in the message 4. In the second example, when the UE does not receive message 4 successfully, the UE considers itself as a potential winner and wait for a period of time or a configured number of re-contention chance (e.g. its identity has been shown on control channel the configured/fixed number of times). Please note that, how long the UE shall be waited and how many chances are allowed to wait can be automatically decided by UE based on standardized rules/considerations or by indicated parameters/configurations.

Please note that, the abovementioned steps of the processes including suggested steps can be realized by means that could be hardware, firmware known as a combination of a hardware device and computer instructions and data that reside as read-only software on the hardware device, or an electronic system. Examples of hardware can include analog, digital and mixed circuits known as microcircuit, microchip, or silicon chip. Examples of the electronic system can include system on chip (SOC), system in package (Sip), computer on module (COM), and the communication device 20.

In conclusion, the exemplary method and means are provided to enhance the random access procedure in the LTE-Advanced system featuring of CoMP (e.g. multiple access points), relay deployment, and carrier aggregation (e.g. multiple component carriers).

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of handling random access procedure for a network in a wireless communications system, the method comprising:
configuring a plurality of access points or a plurality of component carriers with at least one of a plurality of physical random access channel (PRACH) resources, a plurality of preamble formats, and a plurality of preamble sequences; whereby a mobile device of the wireless communication system uses at least one of the plurality of PRACH resources, the plurality of preamble formats, and the plurality of preamble sequences to access at least one of the plurality of access points or the plurality of component carriers when performing at least a random access procedure;
after the mobile device accesses on at least one of the plurality of PRACH resources with at least a preamble transmission, determining which access points or component carriers the mobile device accesses to according to at least one of the accessed PRACH resources, used preamble formats, and used preamble sequences, or determining which access points or component carriers the mobile device accesses to according to at least one of uplink transmission resources that the mobile device accesses to, a temporary cell radio network temporary identifiers (T-CRNTIs) used by the mobile device, a modulation and coding schemes (MCSs) used by the mobile device, a reference signal cyclic shift values used by the mobile device, and an indications for a uplink transmission when receiving the uplink transmissions; and
utilizing at least one of the plurality of access points which receive the at least a preamble to respond to the mobile device at least a random access response (RAR) message addressed by at least a random access radio network temporary identifier (RA-RNTI) associated with the at least one of the accessed PRACH resources.

2. The method of claim 1, wherein the plurality of access points includes at least one of at least a base station and at least a relay of the network; or the plurality of access points are operated at the same component carrier or different component carriers; or a number of the plurality of access points is two or more than two.

3. The method of claim 2, wherein the relay is non-transparent to the mobile device; or the relay has a relay indication or a relay identity, but has no separated cell identity for coverage of the relay.

4. The method of claim 1, wherein the network includes at least one of at least a base station and at least a relay to configure the plurality of access points or the plurality of component carriers with at least one of the plurality of PRACH resources, the plurality of preamble formats, and the plurality of preamble sequences for at least one accessing mobile device.

5. The method of claim 4, wherein configuring the plurality of access points or the plurality of component carriers with the plurality of PRACH resources, the plurality of preamble formats, and the plurality of preamble sequences comprises:
configuring the plurality of access points or the plurality of component carriers with the plurality of PRACH resources, the plurality of preamble formats, and the plurality of preamble sequences broadcasted in system information or in a control signaling from the network.

6. The method of claim 1, further comprising:
responding to the mobile device a downlink message indicating allowed access points or component carriers for the mobile device to access.

7. The method of claim 6, wherein the allowed access points or component carriers are decided by the network according to at least one of a mobile device capability, traffic load, measurement, power control, interference control, and a predefined rule.

8. The method of claim 1, wherein after the mobile device accesses on at least one of the plurality of PRACH resources with at least a preamble transmission, utilizing at least one of the plurality of access points which receive the at least a preamble to respond to the mobile device at least a RAR message addressed by at least a RA-RNTI associated with at least one of the accessed PRACH resources comprises:
utilizing at least one of the plurality of access points to respond to the mobile device with at least a RAR message addressed by at least a RA-RNTI according to at least one of measurement, reception, preamble detection, power control, interference control, or traffic load; or
utilizing at least an access point to respond to the mobile device at least a RAR message addressed by at least a RA-RNTI associated with at least one of the accessed PRACH resources.

9. The method of claim 8, wherein the at least a RAR message for the mobile device includes at least one temporary cell radio network temporary identifiers (T-CRNTIs) or at least one an uplink grant associated with at least one of access points, or is received by the mobile device in a subframe; or
wherein the RAR messages for the mobile device include different temporary cell radio network temporary identifiers (T-CRNTIs) or uplink grants associated with at least one of different access points and different component carriers accessed by the mobile device, or are received by the mobile device in different subframes; or
wherein the RAR message for the mobile device from each of the access points includes distinct temporary cell radio network temporary identifier (T-CRNTI) or an distinct uplink grant associated with the each access point, or is received by the mobile device in a distinct subframe; or
wherein only one of the at least a RAR message includes temporary cell radio network temporary identifier (T-CRNTIs) or an uplink grant associated with a access point, or is received by the mobile device in a distinct subframe.

10. The method of claim 8, wherein the RAR message is determined by the network or the at least one access point according to a traffic load, a measurement, or a predefined rule.

11. The method of claim 1, wherein the RAR message from each of the access points is addressed by a RA-RNTI associated with each of the access points respectively; or the RAR message from each of the access points is addressed by the same RA-RNTI; or the RAR message from each of access points is received by the mobile device on different physical down link control channels (PDCCHs) associated with the access points respectively, or on the same PDCCH.

* * * * *